United States Patent
Lin et al.

(10) Patent No.: US 10,696,185 B2
(45) Date of Patent: *Jun. 30, 2020

(54) UNMANNED AERIAL VEHICLE DOCK AND BATTERY REPLACEMENT DEVICE THEREOF

(71) Applicant: SZ DJI TECHNOLOGY CO., LTD., Shenzhen (CN)

(72) Inventors: Yuan Lin, Shenzhen (CN); Mingxi Wang, Shenzhen (CN); Hongju Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,312

(22) Filed: Mar. 18, 2019

(65) Prior Publication Data
US 2019/0210482 A1 Jul. 11, 2019

Related U.S. Application Data

(63) Continuation of application No. 15/413,474, filed on Jan. 24, 2017, now Pat. No. 10,259,332, which is a (Continued)

(30) Foreign Application Priority Data

Jul. 31, 2014 (WO) ................ PCT/CN2014/083477

(51) Int. Cl.
*B60L 53/80* (2019.01)
*B25J 9/00* (2006.01)
(Continued)

(52) U.S. Cl.
CPC ................. *B60L 53/80* (2019.02); *B25J 9/00* (2013.01); *B60L 53/12* (2019.02); *B60L 53/14* (2019.02);
(Continued)

(58) Field of Classification Search
CPC .......... B60L 53/80; B60L 53/36; B60L 53/12; B60L 53/14; B64F 1/02; B64F 5/40;
(Continued)

(56) References Cited

U.S. PATENT DOCUMENTS 8,511,606 B1    8/2013  Lutke
9,561,870 B2 *  2/2017  Zhou ...................... B64D 47/08
(Continued)

FOREIGN PATENT DOCUMENTS

CN        201590431 U     9/2010
CN        102969534 A     3/2013
(Continued)

OTHER PUBLICATIONS

The World Intellectual Property Organization (WIPO) International Search Report for PCT/CN2014/083981 dated Mar. 27, 2015 8 Pages.

(Continued)

*Primary Examiner* — M Baye Diao
(74) *Attorney, Agent, or Firm* — Anova Law Group, PLLC

(57) ABSTRACT

A battery replacement device including a first linear motion mechanism, a second linear motion mechanism mounted on the first linear motion mechanism, a third linear motion mechanism mounted on the second linear motion mechanism, and a clamp mechanism mounted on one of the first, second, and third linear motion mechanisms. Each of the first, second, and third linear motion mechanisms includes a carrying member and a driving member configured to drive the carrying member to move translationally in one of a first axis direction, a second axis direction, and a third axis direction that build a three-dimensional Cartesian coordinate system. A coordinate position of the clamp mechanism in the three-dimensional Cartesian coordinate system is adjusted
(Continued)

by the first driving member, the second driving member, and the third driving member.

20 Claims, 10 Drawing Sheets

Related U.S. Application Data continuation of application No. PCT/CN2014/083981, filed on Aug. 8, 2014.

(51) Int. Cl.
  *B60L 53/14* (2019.01)
  *B60L 53/12* (2019.01)
  *B60L 53/36* (2019.01)
  *B64F 5/40* (2017.01)
  *B64F 1/02* (2006.01)
  *B64F 5/00* (2017.01)
  *B64C 39/02* (2006.01)
  *B64F 1/22* (2006.01)
  *B64F 1/36* (2017.01)

(52) U.S. Cl.
  CPC ............ *B60L 53/36* (2019.02); *B64C 39/024* (2013.01); *B64F 1/02* (2013.01); *B64F 1/22* (2013.01); *B64F 1/362* (2013.01); *B64F 5/00* (2013.01); *B64F 5/40* (2017.01); *B64C 2201/042* (2013.01); *B64C 2201/182* (2013.01)

(58) Field of Classification Search
  CPC .... B64F 1/362; B64F 1/22; B64F 5/00; B64C 39/024; B64C 2201/182; B64C 2201/042; B25J 9/00
  USPC ......................................................... 320/108
  See application file for complete search history.

(56) References Cited

U.S. PATENT DOCUMENTS

| | | | |
|---|---|---|---|
| 2006/0216580 A1* | 9/2006 | Schlosser | H01M 2/1016 429/97 |
| 2007/0113921 A1 | 5/2007 | Capizzo | |
| 2010/0025160 A1* | 2/2010 | Bojji | B61B 7/00 185/33 |
| 2014/0124621 A1 | 5/2014 | Godzdanker et al. | |

FOREIGN PATENT DOCUMENTS

| | | |
|---|---|---|
| CN | 202922160 U | 5/2013 |
| CN | 202922651 U | 5/2013 |
| CN | 202929406 U | 5/2013 |
| CN | 202949253 U | 5/2013 |
| CN | 103434839 A | 12/2013 |
| CN | 103872795 A | 6/2014 |
| CN | 204210741 U | 3/2015 |
| JP | S58114878 A | 7/1983 |
| JP | S60150041 A | 8/1985 |
| JP | S63119582 U | 8/1988 |
| JP | H02129312 U | 10/1990 |
| JP | H05058407 A | 3/1993 |
| JP | H07215416 A | 8/1995 |
| JP | H10181809 A | 7/1998 |
| JP | 2002067838 A | 3/2002 |
| JP | 2002144161 A | 5/2002 |
| JP | 2002370187 A | 12/2002 |
| JP | 2011518710 A | 6/2011 |
| JP | 2012529408 A | 11/2012 |
| JP | 2013047150 A | 3/2013 |
| JP | 2013169868 A | 9/2013 |
| JP | 2013203394 A | 10/2013 |
| JP | 2013241177 A | 12/2013 |
| JP | 2014023253 A | 2/2014 |
| JP | 2014123999 A | 7/2014 |
| KR | 1020130122715 A | 11/2013 |
| WO | 2012111155 A1 | 8/2012 |

OTHER PUBLICATIONS

Compact Industrial Robot General Catalog 2003, Total Catalog 2003, IAI, Japan. Part 1.
Compact Industrial Robot General Catalog 2003, Total Catalog 2003, IAI, Japan. Part 2.
Compact Industrial Robot General Catalog 2003, Total Catalog 2003, IAI, Japan. Part 3.
Compact Industrial Robot General Catalog 2003, Total Catalog 2003, IAI, Japan. Part 4.
Compact Industrial Robot General Catalog 2003, Total Catalog 2003, IAI, Japan. Part 5.
Compact Industrial Robot General Catalog 2003, Total Catalog 2003, IAI, Japan. Part 6.
Compact Industrial Robot General Catalog 2003, Total Catalog 2003, IAI, Japan. Part 7.

* cited by examiner

UNMANNED AERIAL VEHICLE DOCK AND BATTERY REPLACEMENT DEVICE THEREOF

CROSS-REFERENCE TO RELATED APPLICATIONS

This application is a continuation of application Ser. No. 15/413,474, filed on Jan. 24, 2017, which is a continuation of International Application No. PCT/CN2014/083981, filed on Aug. 8, 2014, which claims the benefit of priority to International Application No. PCT/CN2014/083477, filed on Jul. 31, 2014, the entire contents of all of which are incorporated herein by reference.

TECHNICAL FIELD

The present disclosure relates to an unmanned aerial vehicle dock, and in particular, to an unmanned aerial vehicle dock capable of automatically replacing a battery of an unmanned aerial vehicle and a battery replacement device of the dock.

BACKGROUND

A battery life of a small scale unmanned aerial vehicle is limited. In order to adapt the unmanned aerial vehicle to a fully automated flight operation, some research institutes and commercial companies have been designing an unmanned aerial vehicle ground dock capable of automatically replacing batteries of unmanned aerial vehicles.

A carousel battery compartment is provided in traditional unmanned aerial vehicle ground docks for battery storage. The carousel battery compartment has a complicated structure and a large volume. However, only a small number of batteries can be stored in the rotary battery compartment, which increasing a vertical height and an overall size.

SUMMARY

The present disclosure provides a battery replacement device of an unmanned aerial vehicle dock having a compact structure and a smaller volume.

In one aspect, the present disclosure provides a battery replacement device of an unmanned aerial vehicle dock for replacing a battery of an unmanned aerial vehicle. The battery replacement device can comprise: a clamp mechanism for gripping the battery; a first linear motion mechanism for driving a translational movement of the clamp mechanism in a first axis direction; a second linear motion mechanism for driving a translational movement of the clamp mechanism in a second axis direction; and a third linear motion mechanism for driving a translational movement of the clamp mechanism in a third axis direction. The first axis direction, the second axis direction and the third axis direction can build a three-dimensional Cartesian coordinate system, and a coordinate position of the clamp mechanism in the three-dimensional Cartesian coordinate system can be adjusted by the first linear motion mechanism, the second linear motion mechanism and the third linear motion mechanism.

The unmanned aerial vehicle dock consistent with the present disclosure is advantageous over conventional art.

According to an aspect, the battery replacement device of the unmanned aerial vehicle dock comprises three linear motion mechanisms which build a Cartesian coordinate system. The clamp mechanism can be driven by the three linear motion mechanisms to place a battery of an unmanned aerial vehicle into the battery compartment or take a battery of an unmanned aerial vehicle out from the battery compartment, without employing a rotary battery compartment which occupies a larger volume. When the battery replacement device completes a battery replacement or ceases an operation, the battery replacement device can move to a side of the internal space in the unmanned aerial vehicle dock by a translational movement of the three linear motion mechanisms and then contracted, such that the internal space in the unmanned aerial vehicle dock can be reduced. The battery replacement device of the unmanned aerial vehicle dock consistent with the present disclosure has a compact structure and smaller volume; thereby the unmanned aerial vehicle dock can be minimized.

According to another aspect, the battery replacement device of the unmanned aerial vehicle dock consistent with the present disclosure comprises three linear motion mechanisms which build a Cartesian coordinate system. A battery of an unmanned aerial vehicle can be directly inserted into the battery compartment without a need of adjusting an orientation of the battery by an additional driving means. The battery replacement device of the unmanned aerial vehicle dock consistent with the present disclosure has a simpler structure and a lower cost than a conventional battery replacement device.

In some embodiments, the first linear motion mechanism, the second linear motion mechanism and the third linear motion mechanism can move sequentially. Alternatively, at least two of the first linear motion mechanism, the second linear motion mechanism and the third linear motion mechanism can move simultaneously.

In some embodiments, the three-dimensional Cartesian coordinate system can be a rectangular coordinate system or an oblique coordinate system.

In some embodiments, the first linear motion mechanism can be a rotary motor-driven linear motion mechanism, a belt linear motion mechanism, an air cylinder-driven linear motion mechanism or a linear motor-driven linear motion mechanism.

In some embodiments, the second linear motion mechanism can be a rotary motor-driven linear motion mechanism, a belt linear motion mechanism, an air cylinder-driven linear motion mechanism or a linear motor-driven linear motion mechanism.

In some embodiments, the third linear motion mechanism can be a rotary motor-driven linear motion mechanism, a belt linear motion mechanism, an air cylinder-driven linear motion mechanism or a linear motor-driven linear motion mechanism.

In some embodiments, the clamp mechanism can be a vacuum suction cup clamp mechanism, a magnet clamp mechanism or a mechanical gripper clamp mechanism.

In some embodiments, the clamp mechanism can be provided on the third linear motion mechanism, the third linear motion mechanism can be disposed on the second linear motion mechanism, the second linear motion mechanism can be disposed on the first linear motion mechanism, and the first linear motion mechanism can be disposed on a base plate. The third linear motion mechanism and the first linear motion mechanism can move in parallel to the base plate, the second linear motion mechanism can move to approach or leave the base plate In some embodiments, the clamp mechanism can be disposed on the third linear motion mechanism, the clamp mechanism can be provided on the third linear motion mechanism, the third linear motion mechanism can be disposed on the second linear motion mechanism, the second linear motion mechanism can be disposed on the first linear motion mechanism, and the first linear motion mechanism can be disposed on a base plate. The second linear motion mechanism and the first linear motion mechanism can move in parallel to the base plate, the third linear motion mechanism can move to approach or leave the base plate.

In some embodiments, the clamp mechanism can be provided on the third linear motion mechanism, the third linear motion mechanism can be disposed on the second linear motion mechanism, the second linear motion mechanism can be disposed on the first linear motion mechanism, and the first linear motion mechanism can be disposed on a base plate. The third linear motion mechanism and the second linear motion mechanism can move in parallel to the base plate, the first linear motion mechanism can move to approach or leave the base plate.

In another aspect, the present disclosure provides a battery replacement device of the unmanned aerial vehicle dock.

The battery replacement device of the unmanned aerial vehicle dock for replacing a battery of an unmanned aerial vehicle can comprise: a first linear motion mechanism which comprises a first driving member and a first carrying member, the first driving member driving a translational movement of a first carrying member in a first axis direction; a second linear motion mechanism which is mounted on the first carrying member and comprises a second driving member and a second carrying member, the second driving member driving a translational movement of the second carrying member in a second axis direction; a third linear motion mechanism which is mounted on the second carrying member and comprises a third driving member and a third carrying member, the third driving member driving a translational movement of the third carrying member to move in a third axis direction; and a clamp mechanism which is mounted on the third carrying member and grips the battery. In some embodiments, the first axis direction, the second axis direction and the third axis direction can build a three-dimensional Cartesian coordinate system, and a coordinate position of the clamp mechanism in the three-dimensional Cartesian coordinate system can be adjusted by the first driving member, the second driving member and the third driving member.

The unmanned aerial vehicle dock consistent with the present disclosure is advantageous over conventional art.

According to an aspect, the battery replacement device comprises three linear motion mechanisms which build a Cartesian coordinate system. The clamp mechanism can be driven by the three linear motion mechanisms to place a battery of an unmanned aerial vehicle into the battery compartment or take a battery of an unmanned aerial vehicle out from the battery compartment, without employing a rotary battery compartment which occupies a larger volume. When the battery replacement device completes a battery replacement or ceases an operation, the battery replacement device can move to a side of the internal space in the unmanned aerial vehicle dock by a translational movement of the three linear motion mechanisms and then contracted, such that the internal space in the unmanned aerial vehicle dock can be reduced. The battery replacement device of the unmanned aerial vehicle dock consistent with the present disclosure has a compact structure and smaller volume; thereby the unmanned aerial vehicle dock can be minimized.

According to another aspect, the battery replacement device consistent with the present disclosure comprises three linear motion mechanisms which build a Cartesian coordinate system. A battery of an unmanned aerial vehicle can be directly inserted into the battery compartment without a need of adjusting an orientation of the battery by an additional driving means. The battery replacement device of the unmanned aerial vehicle dock consistent with the present disclosure has a simpler structure and a lower cost than a conventional battery replacement device.

According to still another aspect, the battery replacement device consistent with the present disclosure comprises three independent driving members for driving three carrying members respectively. Two of the three carrying members can carry two linear motion mechanisms, and the other one of the three carrying members can carry the clamp mechanism. The three carrying members can translate independently, such that a stability and flexibility of the clamp mechanism in moving operation is improved.

In some embodiments, the first linear motion mechanism can further comprise a first guiding member which is disposed in parallel to the first axis direction. The first carrying member can be provided with a first fitting member which is fitted with the first guiding member, such that the first carrying member slides along the first guiding member.

In some embodiments, the first guiding member can be a rail which is disposed in parallel to the first axis direction. The first fitting member can be a sliding block which is fixed on a bottom of the first carrying member and provided with a sliding groove having a shape fitted with the rail. Alternatively, the first guiding member can be a guide rod which is disposed in parallel to the first axis direction. The first fitting portion can be a hole provided on the first carrying member. The guide rod can penetrate through the hole and slide inside the hole.

In some embodiments, the first driving member can be a rotary motor. The first linear motion mechanism can further comprise a first leadscrew and a first screw nut sleeved thereon. A driving shaft of the first driving member can be fixedly and coaxially connected with one end of the first leadscrew. The first screw nut can be fixedly connected with the first carrying member. The first driving member can drive a rotation of the first leadscrew. The first leadscrew can be in a threaded fit with the first screw nut to drive a movement thereof. The first screw nut can drive a linear translation of the first carrying member.

In some embodiments, the first linear motion mechanism can further comprise one leadscrew seat and two motor brackets. A bearing can be provided at the leadscrew seat. An end of the first leadscrew, which is distal from the first driving member, can be disposed in the bearing of the leadscrew seat. The two motor brackets can be fixed on a base plate and disposed opposite to and spaced from each other. A mounting tab can be provided at each of two opposite ends of the first driving member. The two mounting tabs can be fixedly connected with the two motor brackets respectively to fix the first driving member on the base plate. The first screw nut can be fixed on the first carrying member.

In some embodiments, two first guiding members can be provided. The two first guiding members can be located at two sides of the first leadscrew respectively and disposed in parallel to the first leadscrew.

In some embodiments, the first driving member can be an air cylinder having a link. The link can be fixedly connected with the first carrying member to drive a movement thereof.

In some embodiments, the first driving member can be a linear motor. A primary of the linear motor can be fixedly connected with the first carrying member to drive a synchronous movement thereof. Alternatively, the first driving member can be an air cylinder having no link. A piston of the air cylinder can be fixedly connected with the first carrying member to drive a synchronous movement thereof.

In some embodiments, the first carrying member can be a plate which is provided with a hollow portion.

In some embodiments, the first linear motion mechanism can further comprise a first limit switch which is disposed along the first axis direction for sensing a moving position of the first carrying member.

In some embodiments, the first limit switch can be a photoelectric limit switch, a reed switch limit switch or an inductive limit switch.

In some embodiments, the second linear motion mechanism can further comprise a second guiding member which is disposed in parallel to the second axis direction. The second carrying member can be provided with a second fitting member which is fitted with the second guiding member, such that the second carrying member slides along the second guiding member.

In some embodiments, the second guiding member can be a rail which is disposed in parallel to the second axis direction. The second fitting member can be a sliding block which is fixed on a bottom of the second carrying member and provided with a sliding groove having a shape fitted with the rail. Alternatively, the second guiding member can be a guide rod which is disposed in parallel to the second axis direction. The second fitting portion can be a hole provided on the second carrying member. The guide rod can penetrate through the hole and slide inside the hole.

In some embodiments, the second driving member can be a rotary motor. The second linear motion mechanism can further comprise a second leadscrew and a second screw nut sleeved thereon. A driving shaft of the second driving member can be fixedly and coaxially connected with one end of the second leadscrew. The second screw nut can be fixedly connected with the second carrying member. The second driving member can drive a rotation of the second leadscrew. The second leadscrew can be in a threaded fit with the second screw nut to drive a movement thereof. The second screw nut can drive a linear translation of the second carrying member.

In some embodiments, the second linear motion mechanism can further comprise a motor mounting plate on which the second driving member is fixed. The motor mounting plate can be fixed on the first carrying member through a threaded fastener. The second screw nut can be fixed on the second carrying member.

In some embodiments, two second guiding members can be provided. The two second guiding members can be located at two sides of the second leadscrew respectively and disposed in parallel to the second leadscrew.

In some embodiments, the second driving member can be an air cylinder having a link. The link can be fixedly connected with the second carrying member to drive a movement thereof.

In some embodiments, the second driving member can be a linear motor. A primary of the linear motor can be fixedly connected with the second carrying member to drive a synchronous movement thereof. Alternatively, the second driving member can be an air cylinder having no link. A piston of the air cylinder can be fixedly connected with the second carrying member to drive a synchronous movement thereof.

In some embodiments, the second carrying member can be a plate which is provided with a hollow portion.

In some embodiments, the second linear motion mechanism can further comprise a second limit switch which is disposed along the second axis direction for sensing a moving position of the second carrying member.

In some embodiments, the second linear motion mechanism can further comprise a limit switch mounting plate fixedly connected with the second guiding member. The second limit switch can be mounted on the limit switch mounting plate.

In some embodiments, the second limit switch can be a photoelectric limit switch, a reed switch limit switch or an inductive limit switch.

In some embodiments, the third linear motion mechanism can further comprise a third guiding member which is disposed in parallel to the third axis direction. The third carrying member can be provided with a third fitting member which is fitted with the third guiding member, such that the third carrying member slides along the third guiding member.

In some embodiments, the third guiding member can be a rail which is disposed in parallel to the third axis direction. The third fitting portion can be a sliding block which is fixed on a bottom of the third carrying member and provided with a sliding groove having a shape fitted with the rail. Alternatively, the third guiding member can be a guide rod which is disposed in parallel to the third axis direction. The third fitting portion can be a hole provided on the third carrying member. The guide rod can penetrate through the hole and slide inside the hole.

In some embodiments, the third driving member can be a rotary motor. The third linear motion mechanism can further comprise a third leadscrew and a third screw nut sleeved thereon. A driving shaft of the third driving member can be fixedly and coaxially connected with one end of the third leadscrew. The third screw nut can be fixedly connected with the third carrying member. The third driving member can drive a rotation of the third leadscrew. The third leadscrew can be in a threaded fit with the third screw nut to drive a movement thereof. The third screw nut can drive a linear translation of the third carrying member.

In some embodiments, the third linear motion mechanism can further comprise two guiding member mounting brackets which are fixed on the second carrying member and disposed opposite to and spaced from each other. The third driving member can be mounted at one of the two guiding member mounting brackets. A bearing can be provided at the other one of the two guiding member mounting brackets. An end of the third leadscrew, which is distal from the third driving member, can be disposed in the bearing which is provided at the other one of the two guiding member mounting brackets. Two ends of the third guiding members can be fixed on the two guiding member mounting brackets, respectively. The third screw nut can be fixed on the third carrying member.

In some embodiments, the third linear motion mechanism can further comprise two battery brackets for supporting the battery of the unmanned aerial vehicle. The two battery brackets can be mounted on one of the two guiding member mounting brackets, which being distal from the third driving member, and can be disposed opposite to and spaced from each other.

In some embodiments, one third guiding member can be provided. The third guiding member can be disposed opposite to and in parallel to the third leadscrew.

In some embodiments, the third driving member can be an air cylinder having a link. The link can be fixedly connected with the third carrying member to drive a movement thereof.

In some embodiments, the third driving member can be a linear motor. A primary of the linear motor can be fixedly connected with the third carrying member to drive a synchronous movement thereof. Alternatively, the third driving member can be an air cylinder having no link. A piston of the air cylinder can be fixedly connected with the third carrying member to drive a synchronous movement thereof.

In some embodiments, the third carrying member can be a plate which is provided with a hollow portion.

In some embodiments, the third linear motion mechanism can further comprise a third limit switch which is disposed along the third axis direction for sensing a moving position of the third carrying member.

In some embodiments, the third limit switch can be a photoelectric limit switch, a reed switch limit switch or an inductive limit switch.

In some embodiments, the third linear motion mechanism can further comprise a third limit switch and a limit switch plate. Two ends of the limit switch plate can be fixedly connected with the two guiding member mounting brackets respectively. The third limit switch can be mounted on the limit switch plate.

In some embodiments, the clamp mechanism can be a vacuum suction cup clamp mechanism, a magnet clamp mechanism or a mechanical gripper clamp mechanism.

In another aspect, the present disclosure provides an unmanned aerial vehicle dock having the above-described battery replacement device.

The unmanned aerial vehicle dock can comprise: a base plate; a battery replacement device for replacing a battery of an unmanned aerial vehicle, the battery replacement device comprising a first linear motion mechanism, a second linear motion mechanism, a third linear motion mechanism and a clamp mechanism; and a battery compartment mounted on the base plate. The battery compartment can receive and charge the battery. The first linear motion mechanism can be mounted on the base plate and can comprise a first driving member and a first carrying member. The first driving member can drive the first carrying member to move translationally in a first axis direction. The second linear motion mechanism can be mounted on the first carrying member and can comprise a second driving member and a second carrying member. The second driving member can drive the second carrying member to move translationally in a second axis direction. The third linear motion mechanism can be mounted on the second carrying member and can comprise a third driving member and a third carrying member. The third driving member can drive the third carrying member to move translationally in a third axis direction. The first axis direction, the second axis direction and the third axis direction can build a three-dimensional Cartesian coordinate system. The clamp mechanism can be mounted on the third carrying member and grips the battery. A coordinate position of the clamp mechanism in the three-dimensional Cartesian coordinate system can be adjusted by the first driving member, the second driving member and the third driving member. The battery replacement device can grip the battery, and take out or insert the battery from or into the battery compartment.

The unmanned aerial vehicle dock consistent with the present disclosure is advantageous over conventional art.

According to an aspect, the battery replacement device of the unmanned aerial vehicle dock comprises three linear motion mechanisms which build a Cartesian coordinate system. The clamp mechanism can be driven by the three linear motion mechanisms to place a battery of an unmanned aerial vehicle into the battery compartment or take a battery of an unmanned aerial vehicle out from the battery compartment, without employing a rotary battery compartment which occupies a larger volume. When the battery replacement device completes a battery replacement or ceases an operation, the battery replacement device can move to a side of the internal space in the unmanned aerial vehicle dock by a translational movement of the three linear motion mechanisms and then contracted, such that the internal space in the unmanned aerial vehicle dock can be reduced. The battery replacement device of the unmanned aerial vehicle dock consistent with the present disclosure has a compact structure and smaller volume; thereby the unmanned aerial vehicle dock can be minimized.

According to another aspect, the battery replacement device of the unmanned aerial vehicle dock consistent with the present disclosure comprises three linear motion mechanisms which build a Cartesian coordinate system. A battery of an unmanned aerial vehicle can be directly inserted into the battery compartment without a need of adjusting an orientation of the battery by an additional driving means. The battery replacement device of the unmanned aerial vehicle dock consistent with the present disclosure has a simpler structure and a lower cost than a conventional battery replacement device.

According to still another aspect, the battery replacement device of the unmanned aerial vehicle dock consistent with the present disclosure comprises three independent driving members for driving three carrying members respectively. Two of the three carrying members can carry two linear motion mechanisms, and the other one of the three carrying members can carry the clamp mechanism.

In some embodiments, the first linear motion mechanism can further comprise a first guiding member which is disposed in parallel to the first axis direction. The first carrying member can be provided with a first fitting member which is fitted with the first guiding member, such that the first carrying member slides along the first guiding member.

In some embodiments, the first guiding member can be a rail which is disposed in parallel to the first axis direction. The first fitting member can be a sliding block which is fixed on a bottom of the first carrying member and provided with a sliding groove having a shape fitted with the rail. Alternatively, the first guiding member can be a guide rod which is disposed in parallel to the first axis direction. The first fitting portion can be a hole provided on the first carrying member. The guide rod can penetrate through the hole and slides inside the hole.

In some embodiments, the first driving member can be a rotary motor. The first linear motion mechanism can further comprise a first leadscrew and a first screw nut sleeved thereon. A driving shaft of the first driving member can be fixedly and coaxially connected with one end of the first leadscrew. The first screw nut can be fixedly connected with the first carrying member. The first driving member can drive the first leadscrew to rotate. The first leadscrew can be in a threaded fit with the first screw nut to drive the first screw to rotate. The first screw nut can drive the first carrying member to move translationally.

In some embodiments, the first linear motion mechanism can further comprise one leadscrew seat and two motor brackets. A bearing can be provided at the leadscrew seat. An end of the first leadscrew, which is distal from the first driving member, can be disposed in the bearing of the leadscrew seat. The two motor brackets can be fixed on a base plate and disposed opposite to and spaced from each other. A mounting tab can be provided at each of two opposite ends of the first driving member. The two mounting tabs can be fixedly connected with the two motor brackets respectively to fix the first driving member on the base plate. The first screw nut can be fixed on the first carrying member.

In some embodiments, two first guiding members can be provided. The two first guiding members can be located at two sides of the first leadscrew respectively and disposed in parallel to the first leadscrew.

In some embodiments, the first driving member can be an air cylinder having a link. The link can be fixedly connected with the first carrying member to drive the first carrying member to move.

In some embodiments, the first driving member can be a linear motor. A primary of the linear motor can be fixedly connected with the first carrying member to drive the first carrying member to move synchronously. Alternatively, the first driving member can be an air cylinder having no link. A piston of the air cylinder can be fixedly connected with the first carrying member to drive the first carrying member to move synchronously.

In some embodiments, the first carrying member can be a plate which is provided with a hollow portion.

In some embodiments, the first linear motion mechanism can further comprise a first limit switch which is disposed along the first axis direction for sensing a moving position of the first carrying member.

In some embodiments, the first limit switch can be a photoelectric limit switch, a reed switch limit switch or an inductive limit switch.

In some embodiments, the second linear motion mechanism can further comprise a second guiding member which is disposed in parallel to the second axis direction. The second carrying member can be provided with a second fitting member which is fitted with the second guiding member, such that the second carrying member slides along the second guiding member.

In some embodiments, the second guiding member can be a rail which is disposed in parallel to the second axis direction. The second fitting member can be a sliding block which is fixed on a bottom of the second carrying member and provided with a sliding groove having a shape fitted with the rail. Alternatively, the second guiding member can be a guide rod which is disposed in parallel to the second axis direction. The second fitting portion can be a hole provided on the second carrying member. The guide rod can penetrate through the hole and slides inside the hole.

In some embodiments, the second driving member can be a rotary motor. The second linear motion mechanism can further comprise a second leadscrew and a second screw nut sleeved thereon. A driving shaft of the second driving member can be fixedly and coaxially connected with one end of the second leadscrew. The second screw nut can be fixedly connected with the second carrying member. The second driving member can drive a rotation of the second leadscrew. The second leadscrew can be in a threaded fit with the second screw nut to drive a movement thereof. The second screw nut can drive a linear translation of the second carrying member.

In some embodiments, the second linear motion mechanism can further comprise a motor mounting plate on which the second driving member is fixed. The motor mounting plate can be fixed on the first carrying member through a threaded fastener. The second screw nut can be fixed on the second carrying member.

In some embodiments, two second guiding members can be provided. The two second guiding members can be located at two sides of the second leadscrew respectively and disposed in parallel to the second leadscrew.

In some embodiments, the second driving member can be an air cylinder having a link. The link can be fixedly connected with the second carrying member to drive a movement thereof.

In some embodiments, the second driving member can be a linear motor. A primary of the linear motor can be fixedly connected with the second carrying member to drive a synchronous movement thereof. Alternatively, the second driving member can be an air cylinder having no link. A piston of the air cylinder can be fixedly connected with the second carrying member to drive a synchronous movement thereof.

In some embodiments, the second carrying member can be a plate which is provided with a hollow portion.

In some embodiments, the second linear motion mechanism can further comprise a second limit switch which is disposed along the second axis direction for sensing a moving position of the second carrying member.

In some embodiments, the second linear motion mechanism can further comprise a limit switch mounting plate fixedly connected with the second guiding member. The second limit switch can be mounted on the limit switch mounting plate.

In some embodiments, the second limit switch can be a photoelectric limit switch, a reed switch limit switch or an inductive limit switch.

In some embodiments, the third linear motion mechanism can further comprise a third guiding member which is disposed in parallel to the third axis direction. The third carrying member can be provided with a third fitting member which is fitted with the third guiding member, such that the third carrying member slides along the third guiding member.

In some embodiments, the third guiding member can be a rail which is disposed in parallel to the third axis direction. The third fitting portion can be a sliding block which is fixed on a bottom of the third carrying member and provided with a sliding groove having a shape fitted with the rail. Alternatively, the third guiding member can be a guide rod which is disposed in parallel to the third axis direction. The third fitting portion can be a hole provided on the third carrying member. The guide rod can penetrate through the hole and slides inside the hole.

In some embodiments, the third driving member can be a rotary motor. The third linear motion mechanism can further comprise a third leadscrew and a third screw nut sleeved thereon. A driving shaft of the third driving member can be fixedly and coaxially connected with one end of the third leadscrew. The third screw nut can be fixedly connected with the third carrying member. The third driving member can drive a rotation of the third leadscrew. The third leadscrew can be in a threaded fit with the third screw nut to drive a movement thereof. The third screw nut can drive a linear translation of the third carrying member.

In some embodiments, the third linear motion mechanism can further comprise two guiding member mounting brackets which are fixed on the second carrying member and disposed opposite to and spaced from each other. The third driving member can be mounted at one of the two guiding member mounting brackets. A bearing can be provided at the other one of the two guiding member mounting brackets. An end of the third leadscrew, which is distal from the third driving member, can be disposed in the bearing which is provided at the other one of the two guiding member mounting brackets. Two ends of the third guiding members can be fixed on the two guiding member mounting brackets, respectively. The third screw nut can be fixed on the third carrying member.

In some embodiments, the third linear motion mechanism can further comprise two battery brackets for supporting the battery of the unmanned aerial vehicle. The two battery brackets can be mounted on one of the two guiding member mounting brackets, which being distal from the third driving member, and can be disposed opposite to and spaced from each other.

In some embodiments, one third guiding member is provided, and wherein the third guiding member is disposed opposite to and in parallel to the third leadscrew.

In some embodiments, the third driving member can be an air cylinder having a link. The link can be fixedly connected with the third carrying member to drive a movement thereof.

In some embodiments, the third driving member can be a linear motor. A primary of the linear motor can be fixedly connected with the third carrying member to drive a synchronous movement thereof. Alternatively, the third driving member can be an air cylinder having no link. A piston of the air cylinder can be fixedly connected with the third carrying member to drive a synchronous movement thereof.

In some embodiments, the third carrying member can be a plate which is provided with a hollow portion.

In some embodiments, the third linear motion mechanism can further comprise a third limit switch which is disposed along the third axis direction for sensing a moving position of the third carrying member.

In some embodiments, the third limit switch can be a photoelectric limit switch, a reed switch limit switch or an inductive limit switch.

In some embodiments, the third linear motion mechanism can further comprise a third limit switch and a limit switch plate. Two ends of the limit switch plate can be fixedly connected with the two guiding member mounting brackets respectively. The third limit switch can be mounted on the limit switch plate.

In some embodiments, the clamp mechanism can be a vacuum suction cup clamp mechanism, a magnet clamp mechanism or a mechanical gripper clamp mechanism.

In some embodiments, the battery compartment can comprise a plurality of battery receiving cavities which are arranged in a matrix. Each of the plurality of battery receiving cavities can have an opening which is disposed at a side facing the battery replacement device.

In some embodiments, each of the battery receiving cavities can be provided with a charging apparatus for charging the battery. The charging apparatus can charge the battery when the battery is placed into the battery receiving cavity.

In some embodiments, the charging apparatus can be a non-contact charging apparatus which comprises one of an electromagnetic inductive circuit, a magnetic resonance inductive circuit and a microwave inductive circuit.

In some embodiments, the charging apparatus can be a contact charging apparatus which comprises a charging contactor. The charging contactor can be provided on an inner wall of the opening of each battery receiving cavity. The battery can be provided with a corresponding charging electrode in electrical contact with the charging contactor.

In some embodiments, a fastener structure can be provided on the inner wall of the opening of each battery receiving cavity. The fastener structure can fasten the battery to secure the battery within the battery receiving cavity.

In some embodiments, the fastener structure can be an elastic clip, an electric lock or an electromagnetic lock.

DETAILED DESCRIPTION OF THE EMBODIMENTS

Figure 1:
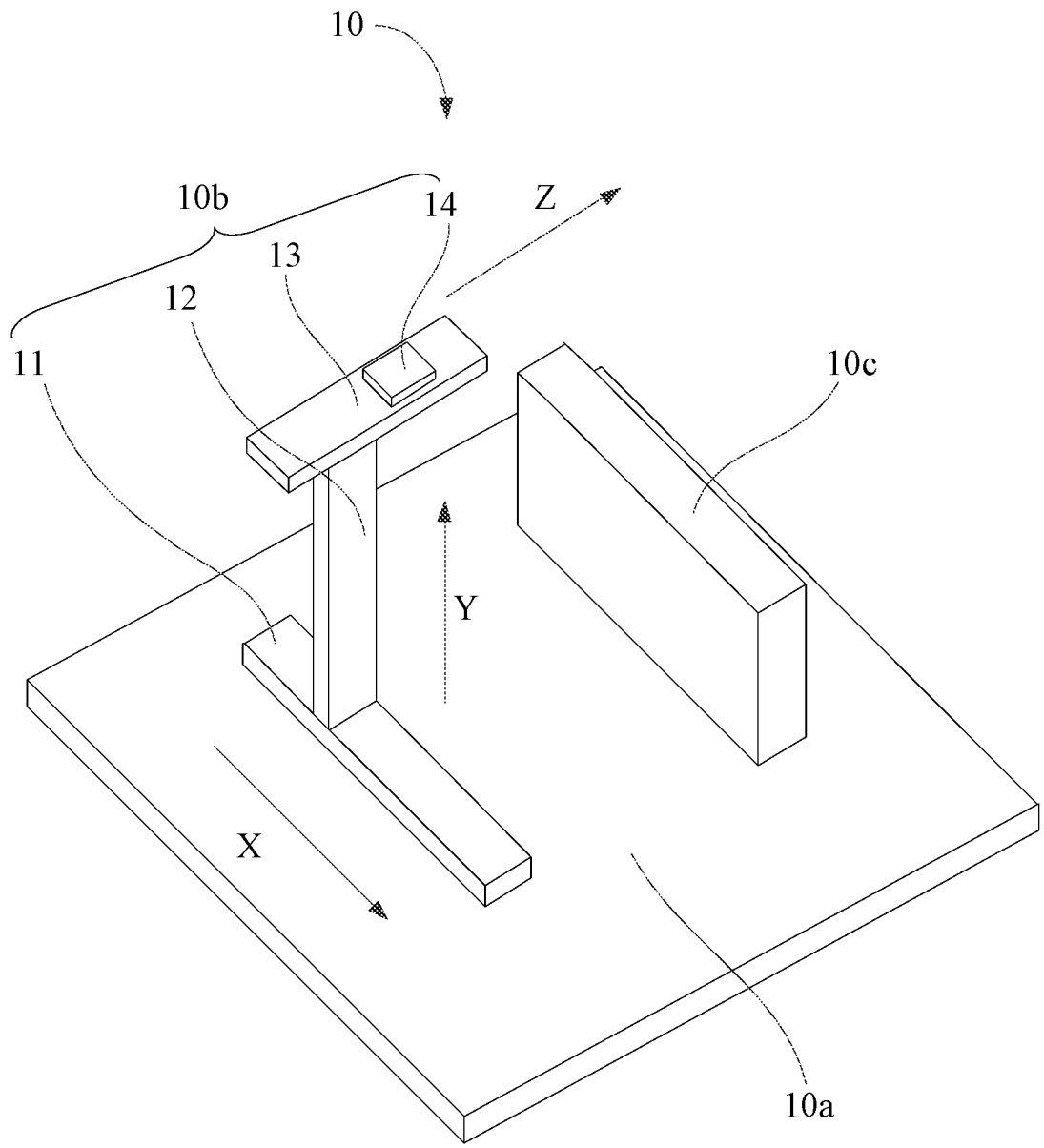
FIG. 1 is a view showing a structure of an unmanned aerial vehicle dock according to an embodiment of the present disclosure.
Figure 2:
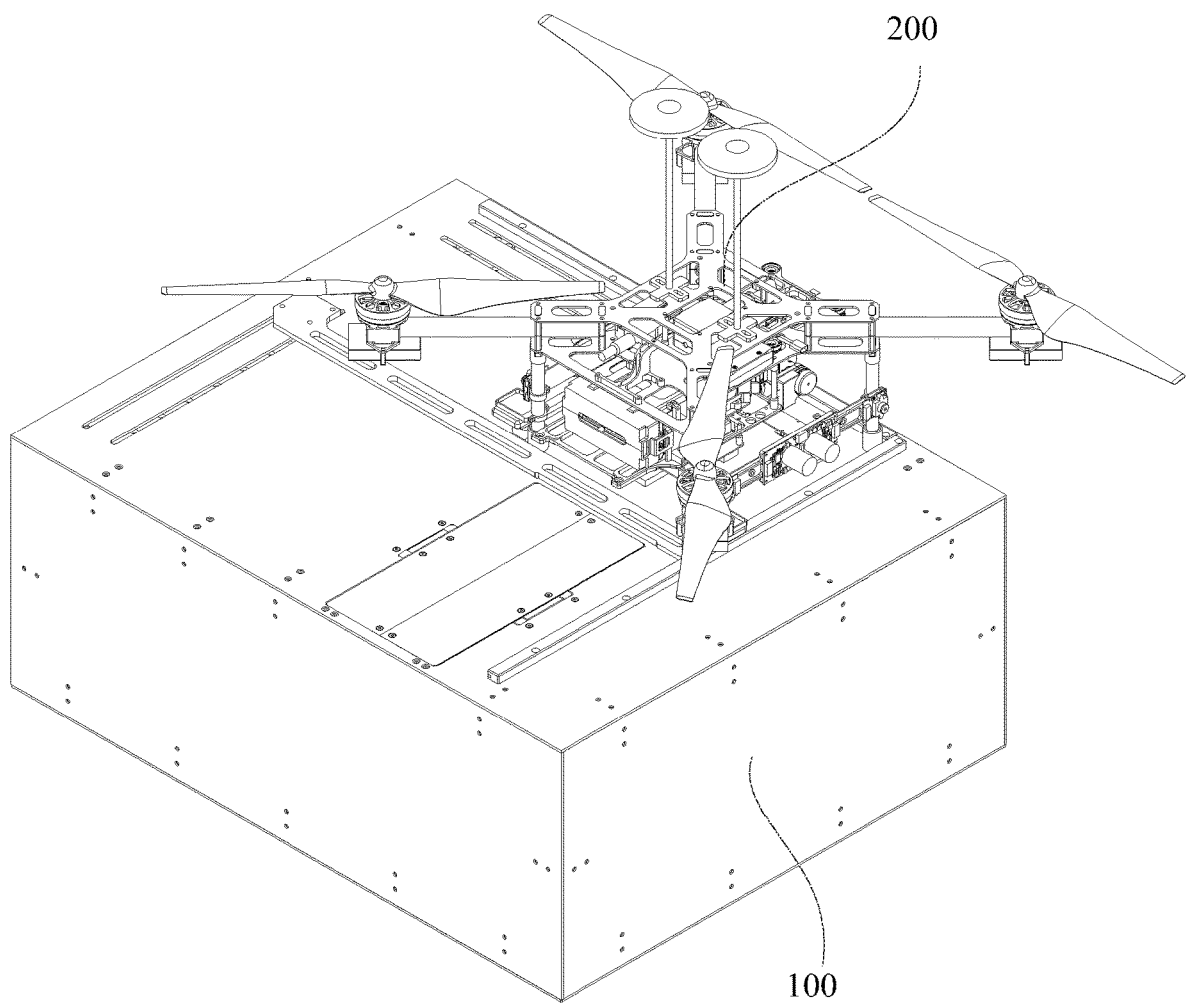
FIG. 2 is a view showing a structure of an unmanned aerial vehicle dock having an unmanned aerial vehicle landed thereon according to an embodiment of the present disclosure.
Figure 3:
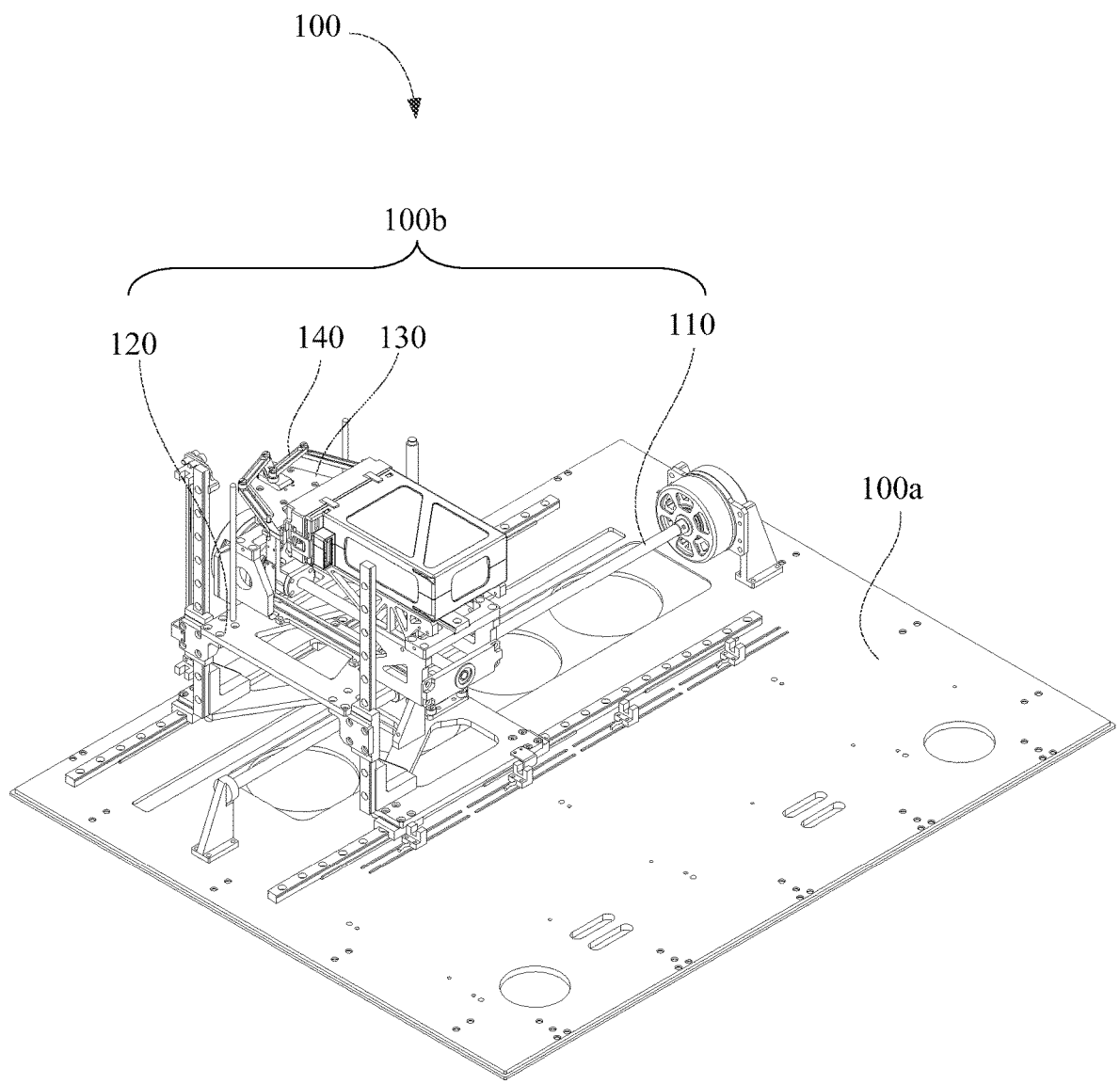
FIG. 3 is a view showing a structure of the unmanned aerial vehicle dock of FIG. 2, a housing of the unmanned aerial vehicle dock being removed.
Figure 4:
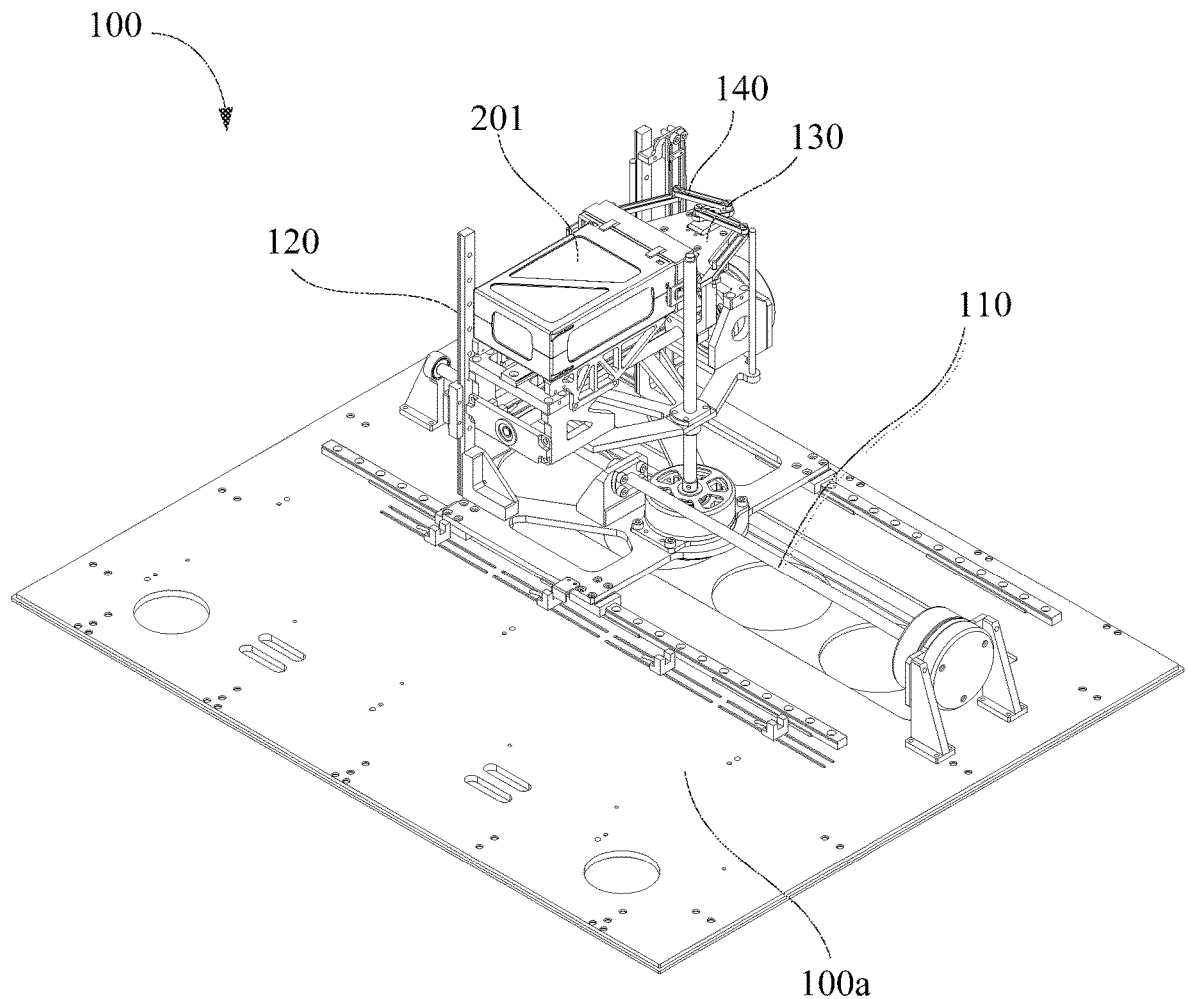
FIG. 4 is a view showing a structure of the unmanned aerial vehicle dock of FIG. 3, viewed from another angle of view.
Figure 5:
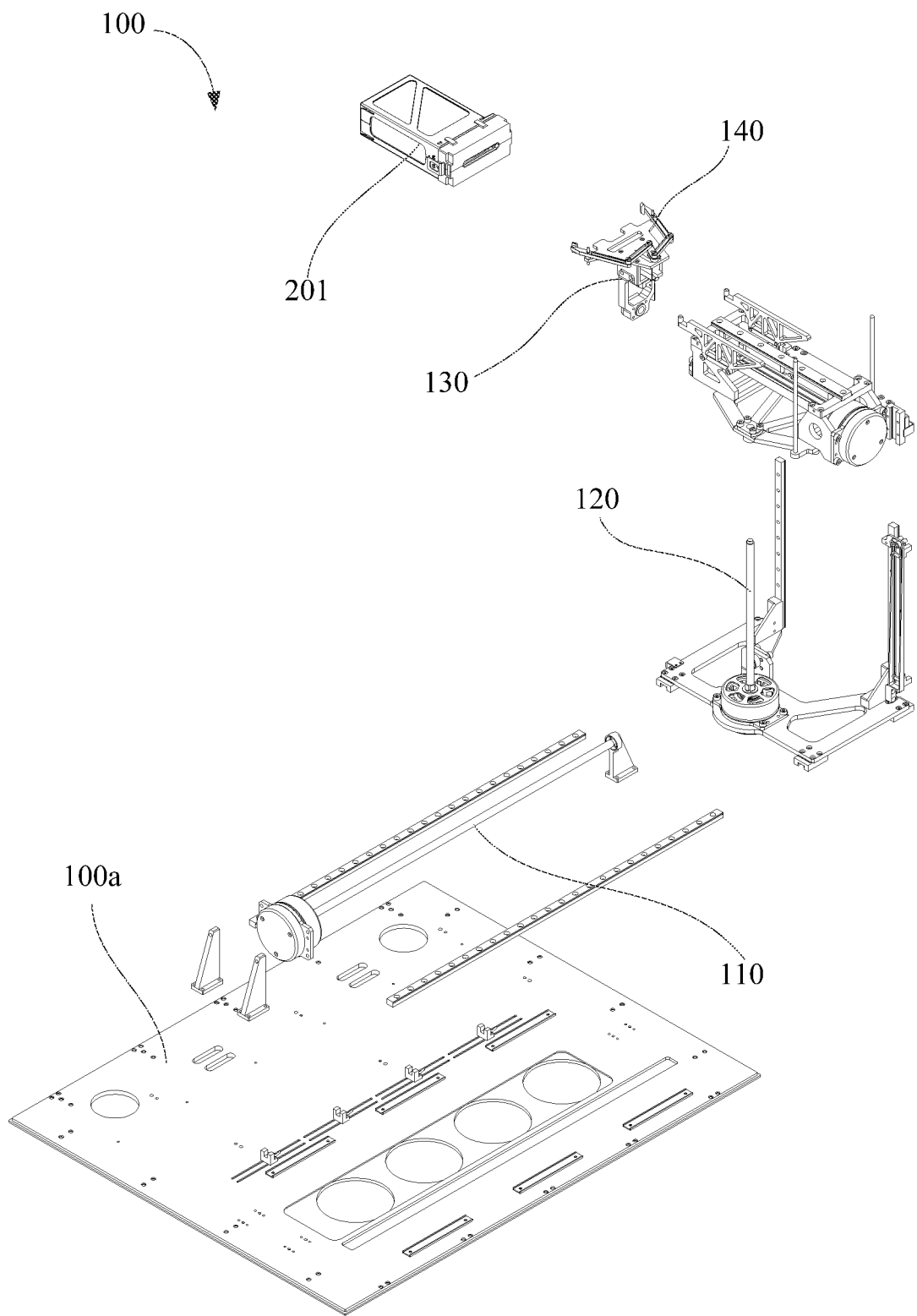
FIG. 5 is an exploded view of the unmanned aerial vehicle dock of FIG. 4.

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

It will be appreciated that, when an element is described to be "fixed to" another element, it can be directly fixed to another element or through an intermediate element. When an element is described to be "connected to" another element, it can be directly connected to another element or through an intermediate element. Terms "vertical", "horizontal", "left", "right" and other expressions are merely for illustrative purposes.

Unless otherwise specified, the technical terms and scientific terms as used in the disclosure have the ordinary meaning to those skilled in the technical fields to which the present disclosure belongs. The terms in the disclosure are used to describe embodiments of the disclosure, with no intent to limit the disclosure. The term 'and/or' as used in the disclosure includes any and all combination(s) of one or more listed items.

The present disclosure provides an unmanned aerial vehicle dock. The unmanned aerial vehicle dock can comprise a battery replacement device and a battery compartment. The battery replacement device can automatically replace a battery of an unmanned aerial vehicle. The battery compartment can receive and charge the battery of the unmanned aerial vehicle.

The battery replacement device can include a clamp mechanism to grasp the battery of the unmanned aerial vehicle, and three linear motion mechanisms to adjust a position of the clamp mechanism. The three linear motion mechanisms can create a three-dimensional Cartesian coordinate system. The battery can be decoupled from or coupled into a battery compartment by the clamp mechanism which is controlled by the three linear motion mechanisms. Since the three linear motion mechanisms can create a three-dimensional Cartesian coordinate system, when the battery replacement device completes a battery replacement or ceases an operation, the three linear motion mechanisms and the clamp mechanism can contract and move to a side of an internal space in the unmanned aerial vehicle dock, such that the internal space in the unmanned aerial vehicle dock can be reduced to minimize a volume of the unmanned aerial vehicle dock.

In some embodiments, the unmanned aerial vehicle dock can be a ground dock. Alternatively, the unmanned aerial vehicle dock can be an aerial dock. For instance, the unmanned aerial vehicle dock can be in the air by a balloon. Alternatively, the unmanned aerial vehicle dock can be a floating dock. For instance, the unmanned aerial vehicle dock can float on a sea surface or a lake surface by a carrier such as a ship.

In some embodiments, the ground dock can be a stationery ground dock, or a portable moving dock.

In some embodiments, the three linear motion mechanisms can create a Cartesian rectangular coordinate system or a Cartesian oblique coordinate system. For instance, if a shape of the internal space in the unmanned aerial vehicle dock is regular such as a rectangle, the three linear motion mechanisms can create a Cartesian rectangular coordinate system to fit the internal space in the unmanned aerial vehicle dock, such that the internal space in the unmanned aerial vehicle dock can be reduced. If the shape of the internal space in the unmanned aerial vehicle dock is a cone and the like, the three linear motion mechanisms can create a Cartesian oblique coordinate system to fit the shape of the internal space in the unmanned aerial vehicle dock to the greatest extent, such that the internal space in the unmanned aerial vehicle dock can be reduced.

In some embodiments, a movement of the three linear motion mechanisms can be performed sequentially or simultaneously. For instance, a movement of the three linear motion mechanisms can be performed sequentially. For another instance, a movement of two linear motion mechanisms can be performed simultaneously. For still another instance, a movement of the three linear motion mechanisms can be formed simultaneously. If a movement of the three linear motion mechanisms is performed simultaneously, a translational movement of the three linear motion mechanisms can complete simultaneously. In other words, $S1/V1=S2/V2=S3/V3$, where S1, S2, S3 are respectively translational displacement of the three linear motion mechanisms, and V1, V2, V3 are respectively translational velocity of the three linear motion mechanisms. Optionally, a translational movement of the three linear motion mechanisms complete sequentially. For example, $S1/V1=S2/V2<S3/V3$, where S3 can be a displacement of the clamp mechanism towards the battery compartment.

In some embodiments, the three linear motion mechanisms can create the Cartesian coordinate system on a base plate in a positive sequence or a negative sequence.

For instance, the three linear motion mechanisms can comprise an X-axis structure, a Y-axis structure and a Z-axis structure. The X-axis structure and the Y-axis structure can respectively adjust a movement along two coordinates which are in parallel to the base plate, and the Z-axis structure can adjust a movement along a coordinate which is perpendicular to the base plate. The X-axis structure can be disposed on the base plate, the Z-axis structure can be disposed on the X-axis structure, and the Y-axis structure can be disposed on the Z-axis structure. Alternatively, the X-axis structure can be disposed on the base plate, the Y-axis structure can be disposed on the X-axis structure, and the Z-axis structure can be disposed on the Y-axis structure. Still alternatively, the Z-axis structure can be disposed on the base plate, the X-axis structure can be disposed on the Z-axis structure, and the Y-axis structure can be disposed on the X-axis structure.

Embodiments of the present disclosure will be described with reference to the appended drawings.

Referring to FIG. 1, an unmanned aerial vehicle dock 10 according to embodiment one of the present disclosure can comprise a base plate 10a, a battery replacement device 10b and a battery compartment 10c. The battery replacement device 10b can be mounted on the base plate 10a and replace a battery of an unmanned aerial vehicle. The battery compartment 10c can receive and charge a battery of the unmanned aerial vehicle.

The battery replacement device 10b can comprise a first linear motion mechanism 11, a second linear motion mechanism 12, a third linear motion mechanism 13 and a clamp mechanism 14. The clamp mechanism 14 can grasp the battery. The first linear motion mechanism 11 can drive and translate the clamp mechanism 10 in a first axis direction X. The second linear motion mechanism 12 can drive and translate the clamp mechanism 14 in a second axis direction Y. The third linear motion mechanism 13 can drive and translate the clamp mechanism 14 in a third axis direction Z. In some embodiments, the first axis direction X, the second axis direction Y and the third axis direction Z can build a three-dimensional Cartesian coordinate system. A coordinate position of the clamp mechanism 14 in the three-dimensional Cartesian coordinate system can be adjusted by the first linear motion mechanism 11, the second linear motion mechanism 12 and the third linear motion mechanism 13.

The first linear motion mechanism 11, the second linear motion mechanism 12 and the third linear motion mechanism 13 can operate synchronously. Optionally, the first linear motion mechanism 11, the second linear motion mechanism 12 and the third linear motion mechanism 13 can operate separately. For instance, in the illustrated embodiment, the first linear motion mechanism 11, the second linear motion mechanism 12 and the third linear motion mechanism 13 can operate sequentially. Optionally, at least two of the first linear motion mechanism 11, the second linear motion mechanism 12 and the third linear motion mechanism 12 can operate simultaneously.

The Cartesian coordinate system can be a rectangular coordinate system. Optionally, the Cartesian coordinate system can be an oblique coordinate system. An appropriate coordinate system can be determined based on a shape of an internal space of the unmanned aerial vehicle dock 10. For instance, if the internal space in the unmanned aerial vehicle dock 10 is a cubic, a Cartesian rectangular coordinate system can be built; thereby the internal space in the unmanned aerial vehicle dock 10 can be reduced. If the internal space in the unmanned aerial vehicle dock 10 is a pyramid or a similar shape, a Cartesian oblique coordinate system can be built; thereby the internal space in the unmanned aerial vehicle dock 10 can be reduced.

A specific structure of the first linear motion mechanism 11 can be determined based on actual requirements. For instance, the first linear motion mechanism 11 can be a rotary motor-driven linear motion mechanism, a belt linear motion mechanism, an air cylinder-driven linear motion mechanism or a linear motor-driven linear motion mechanism. In a rotary motor-driven linear motion mechanism, a leadscrew can be driven by a rotary motor to rotate. A screw nut can be sleeved on the leadscrew and be in a threaded fit with the leadscrew. The screw nut can be driven to move linearly, and then drive a movement of a carried object. In a belt linear motion mechanism, a belt can be driven by a belt pulley. A carried object, which is fixed on the belt, can move synchronously with the belt. In an air cylinder-driven linear motion mechanism, a carried object can be driven by an air cylinder. For instance, the air cylinder can be an air cylinder provided with a retractable link. The retractable link can drive a movement of the carried object. For another instance, the air cylinder can be an air cylinder having no link. A carried object can be connected to and driven by a piston of the air cylinder, such that the carried object can move synchronously with the piston. In a linear motor-driven linear motion mechanism, a movement of a carried object can be driven by a primary of the linear motor synchronously.

A specific structure of the second linear motion mechanism 12 can be determined based on actual requirements. For instance, the second linear motion mechanism 12 can be a rotary motor-driven linear motion mechanism, a belt linear motion mechanism, an air cylinder-driven linear motion mechanism or a linear motor-driven linear motion mechanism. An operational principle of the rotary motor-driven linear motion mechanism, the belt linear motion mechanism, the air cylinder-driven linear motion mechanism or the linear motor-driven linear motion mechanism is described hereinabove.

A specific structure of the third linear motion mechanism 13 can be determined based on actual requirements. For instance, the third linear motion mechanism 13 can be a rotary motor-driven linear motion mechanism, a belt linear motion mechanism, an air cylinder-driven linear motion mechanism or a linear motor-driven linear motion mechanism. An operational principle of the rotary motor-driven linear motion mechanism, the belt linear motion mechanism, the air cylinder-driven linear motion mechanism or the linear motor-driven linear motion mechanism is described hereinabove.

A specific structure of the first linear motion mechanism 11, the second linear motion mechanism 12 and the third linear motion mechanism 13 can be identical or not. For instance, the first linear motion mechanism 11 and the second linear motion mechanism 12 can be the linear motor-driven linear motion mechanism, while the third linear motion mechanism 13 can be the rotary motor-driven linear motion mechanism. Alternatively, the first linear motion mechanism 11, the second linear motion mechanism 12 and the third linear motion mechanism 13 can each be the rotary motor-driven linear motion mechanism.

The clamp mechanism 14 can be a vacuum suction cup clamp mechanism, a magnet clamp mechanism or a mechanical gripper clamp mechanism. In a vacuum suction cup clamp mechanism, a battery of the unmanned aerial vehicle can be held by a vacuum suction cup. When gripping the battery of the unmanned aerial vehicle, an air cylinder in air communication with the vacuum suction cup can operate to expel an air in the vacuum suction cup; and when releasing the battery of the unmanned aerial vehicle, the air cylinder in air communication with the vacuum suction cup can cease an operation blow up the vacuum suction cup. In a magnet clamp mechanism, an iron member of the battery of the unmanned aerial vehicle can be attracted by an electrical magnet. When the magnet clamp mechanism grips the battery of the unmanned aerial vehicle, the electrical magnet can be powered on; and when the magnet clamp mechanism releases the battery of the unmanned aerial vehicle, the electrical magnet can be powered off. In a mechanical gripper clamp mechanism, the battery of the unmanned aerial vehicle can be grasped by a clamp structure which is similar to human fingers.

A position relationship of the first linear motion mechanism 11, the second linear motion mechanism 12 and the third linear motion mechanism 13 can be determined based on actual requirements. For instance, in some embodiments, the clamp mechanism 14 can be provided on the third linear motion mechanism 13. The third linear motion mechanism 13 can be disposed on the second linear motion mechanism 12, the second linear motion mechanism 12 can be disposed on the first linear motion mechanism 11, and the first linear motion mechanism 11 can be disposed on the base plate 10a. The third linear motion mechanism 13 and the first linear motion mechanism 11 can move in parallel to the base plate 10a, and the second linear motion mechanism 12 can move to approach or leave the base plate 10a.

Alternatively, the clamp mechanism 14 can be provided on the third linear motion mechanism 13. The third linear motion mechanism 13 can be disposed on the second linear motion mechanism 12, the second linear motion mechanism 12 can be disposed on the first linear motion mechanism 11, and the first linear motion mechanism 11 can be disposed on the base plate 10a. The second linear motion mechanism 12 and the first linear motion mechanism 11 can move in parallel to the base plate 10a, and the third linear motion mechanism 13 can move to approach or leave the base plate 10a.

Alternatively, the clamp mechanism 14 can be provided on the third linear motion mechanism 13. The third linear motion mechanism 13 can be disposed on the second linear motion mechanism 12, the second linear motion mechanism 12 can be disposed on the first linear motion mechanism 11, and the first linear motion mechanism 11 can be disposed on the base plate 10a. The third linear motion mechanism 13 and the second linear motion mechanism 12 can move in parallel to the base plate 10a, and the first linear motion mechanism 11 can move to approach or leave the base plate 10a.

A specific structure of the battery compartment 10c can be determined based on actual requirements. For instance, in some embodiments, the battery compartment 10c can comprise a plurality of battery receiving cavities which are arranged in a matrix. Each battery receiving cavity can have an opening which is disposed at a side facing the battery replacement device 10b.

Each battery receiving cavity can be provided with a charging apparatus for charging a battery. The charging apparatus can charge the battery if the battery is placed into the battery receiving cavity.

The charging apparatus can be a non-contact charging apparatus. Alternatively, the charging apparatus can be a contact charging apparatus. For instance, in some embodiments, the charging apparatus can be a non-contact charging apparatus which comprises one of an electromagnetic inductive circuit, a magnetic resonance inductive circuit and a microwave inductive circuit. Optionally, the charging apparatus can be a contact charging apparatus which comprises a charging contact. The charging contact can be provided on an inner wall of an opening of each battery receiving cavity. The battery can be provided with a corresponding charging electrode in electrical contact with the charging contactor.

A fastener structure can be provided on an inner wall of the opening of each battery receiving cavity. The fastener structure can fasten the battery to secure the battery within the battery receiving cavity.

The fastener structure can be an elastic clip, an electric lock or an electromagnetic lock. In an elastic clip, an outer wall of the battery can be fastened by an elastic clip. The battery can be drawn from or inserted into the battery receiving cavity of the battery compartment 10c by applying an external force onto the battery such that battery abuts against and deform the elastic clip. In an electric lock, a driving member can be controlled by a switch circuit to drive a lock to abut against the outer wall of the battery. When gripping the battery, the switch circuit can power on the driving member to abut the lock against the battery. When releasing the battery, the switch circuit can power off the driving member to separate the lock from the battery. In an electromagnetic lock, the battery can be held by an electromagnet which attracts an iron member of the battery. The electromagnet can be powered off when taking the battery out from the battery receiving cavity of the battery compartment 10c.

The unmanned aerial vehicle dock 10 consistent with the present disclosure is advantageous over conventional art.

According to an aspect, the battery replacement device 10b of the unmanned aerial vehicle dock 10 comprises three linear motion mechanisms which build a Cartesian coordinate system. The clamp mechanism 14 can be driven by the three linear motion mechanisms to place a battery of an unmanned aerial vehicle into the battery compartment 10c or take a battery of an unmanned aerial vehicle out from the battery compartment 10c, without employing a rotary battery compartment 10c which occupies a larger volume. When the battery replacement device 10b completes a battery replacement or ceases an operation, the battery replacement device 10b can move to a side of the internal space in the unmanned aerial vehicle dock 10 by a translational movement of the three linear motion mechanisms and then contracted, such that the internal space in the unmanned aerial vehicle dock 10 can be reduced. The battery replacement device 10b of the unmanned aerial vehicle dock 10 consistent with the present disclosure has a compact structure and smaller volume; thereby the unmanned aerial vehicle dock 10 can be minimized.

According to another aspect, the battery replacement device 10b of the unmanned aerial vehicle dock 10 consistent with the present disclosure comprises three linear motion mechanisms which build a Cartesian coordinate system. A battery of an unmanned aerial vehicle can be directly inserted into the battery compartment 10c without a need of adjusting an orientation of the battery by an additional driving means. The battery replacement device 10b of the unmanned aerial vehicle dock 10 consistent with the present disclosure has a simpler structure and a lower cost than a conventional battery replacement device.

Figure 10:
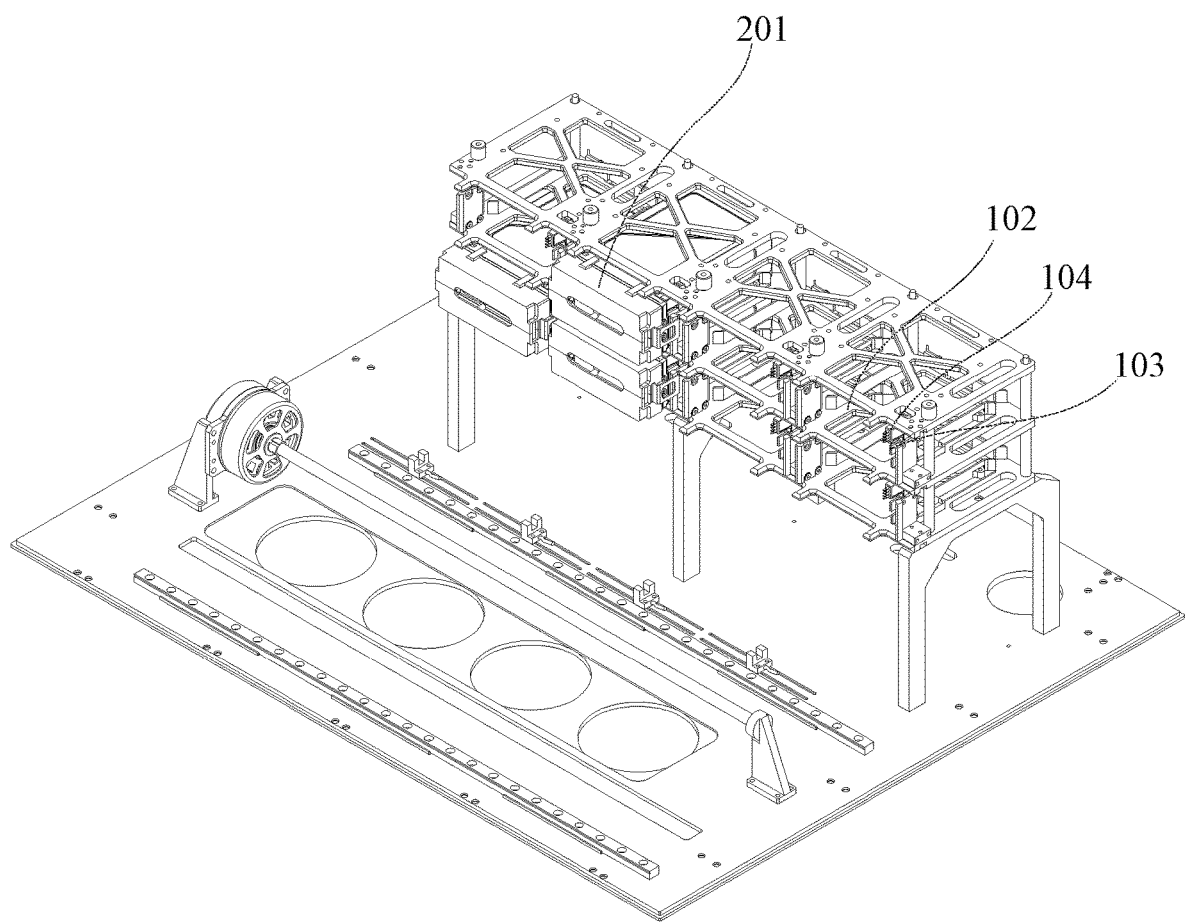
FIG. 10 is a view showing a structure of a battery compartment of the unmanned aerial vehicle dock of FIG. 3.

Referring to FIGS. 2-5, an unmanned aerial vehicle dock 100 according to an embodiment of the present disclosure can comprise a base plate 100a, a battery replacement device 100b and a battery compartment 100c (as shown in FIG. 10). The battery replacement device 100b can be mounted on the base plate 100a for replacing a battery of an unmanned aerial vehicle. The battery compartment 100c can receive and charge the battery 201 of the unmanned aerial vehicle 200.

The battery replacement device 100b can comprise a first linear motion mechanism 110, a second linear motion mechanism 120, a third linear motion mechanism 130 and a clamp mechanism 140. The first linear motion mechanism 110, the second linear motion mechanism 120 and the third linear motion mechanism 130 can operate synchronously. Optionally, the first linear motion mechanism 110, the second linear motion mechanism 120 and the third linear motion mechanism 130 can operate separately. For instance, in the illustrated embodiments, the first linear motion mechanism 110, the second linear motion mechanism 120 and the third linear motion mechanism 130 can operate sequentially. In some embodiments, at least two of the first linear motion mechanism 110, the second linear motion mechanism 120 and the third linear motion mechanism 130 can move simultaneously.

In some embodiments, the clamp mechanism 140 can be provided on the third linear motion mechanism 130. The third linear motion mechanism 130 can be disposed on the second linear motion mechanism 120, the second linear motion mechanism 120 can be disposed on the first linear motion mechanism 110, and the first linear motion mechanism 110 can be disposed on the base plate 100a. In some embodiments, the third linear motion mechanism 130 and the first linear motion mechanism 110 can move parallel to the base plate 100a, and the second linear motion mechanism 120 can move to approach or leave the base plate 100a.

A specific structure of the first linear motion mechanism 110 can be determined based on actual requirements. For instance, the first linear motion mechanism 110 can be a rotary motor-driven linear motion mechanism, a belt linear motion mechanism, an air cylinder-driven linear motion mechanism or a linear motor-driven linear motion mechanism. In a rotary motor-driven linear motion mechanism, a leadscrew can be driven by a rotary motor to rotate. A screw nut can be sleeved on the leadscrew and be in a threaded fit with the leadscrew. The screw nut can be driven to move linearly, and then drive a movement of a carried object. In a belt linear motion mechanism, a belt can be driven by a belt pulley. A carried object, which is fixed on the belt, can move synchronously with the belt. In an air cylinder-driven linear motion mechanism, a carried object can be driven by an air cylinder. For instance, the air cylinder can be an air cylinder provided with a retractable link. The retractable link can drive a movement of the carried object. For another instance, the air cylinder can be an air cylinder having no link. A carried object can be connected to and driven by a piston of the air cylinder, such that the carried object can move synchronously with the piston. In a linear motor-driven linear motion mechanism, a movement of a carried object can be driven by a primary of the linear motor synchronously.

Figure 6:
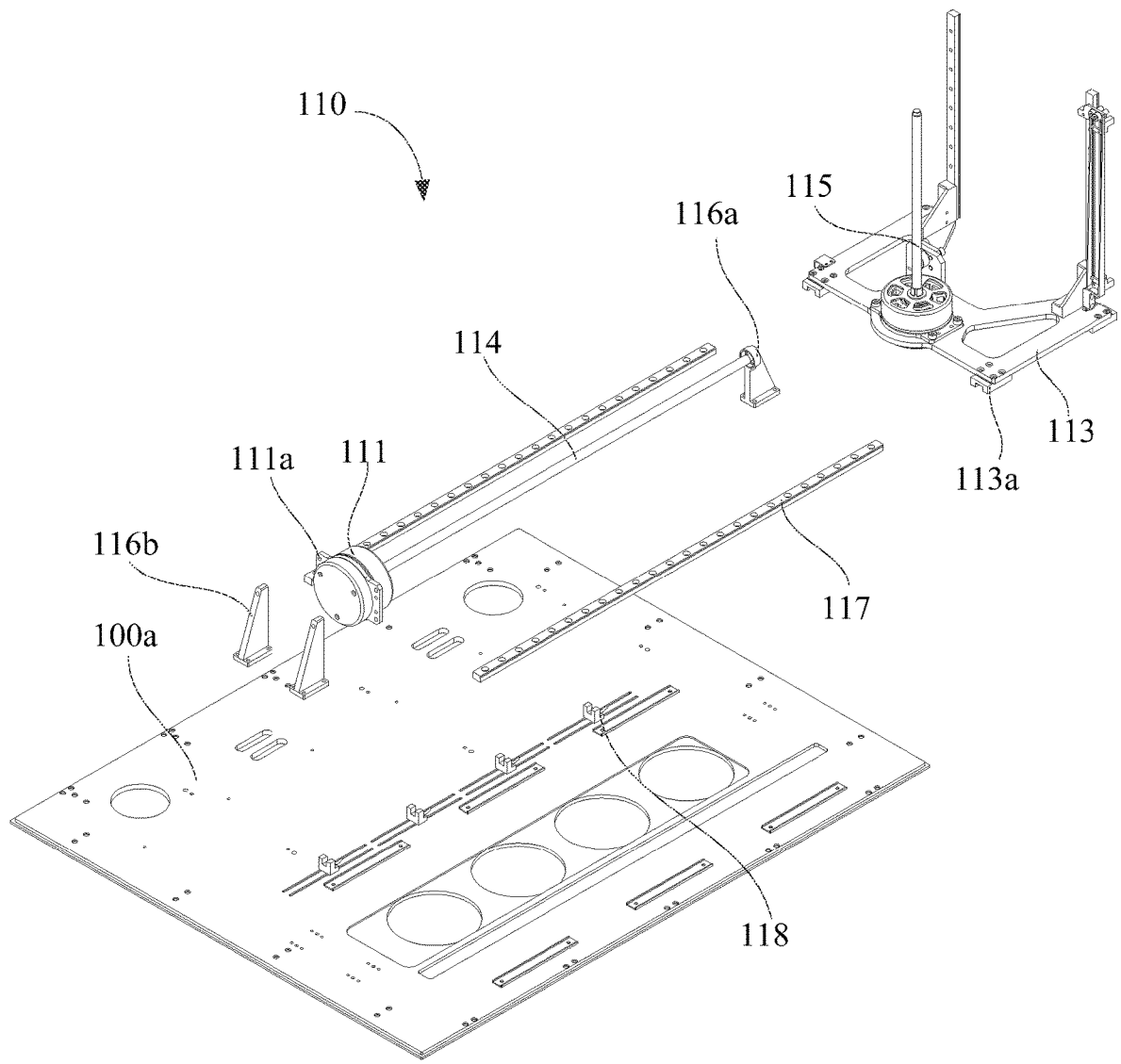
FIG. 6 is an exploded view of a first linear motion mechanism of the unmanned aerial vehicle dock of FIG. 4.

Referring to FIG. 6, in the illustrated embodiments, the first linear motion mechanism 110 can comprise a first driving member 111 and a first carrying member 113. The first driving member 111 can drive the first carrying member 113 to move along a first axis direction.

The first driving member 111 can be an air cylinder or a motor. For instance, in the illustrated embodiments, the first driving member 111 can be a rotary motor. The first linear motion mechanism 110 can comprise a first leadscrew 114 and a first screw nut 115 which is sleeved on the first leadscrew 114. A driving shaft of the first driving member 111 can be fixedly and coaxially connected with one end of the first leadscrew 114. The first screw nut 115 can be fixedly connected with the first carrying member 113. In some embodiments, the first driving member 111 can drive a rotation of the first leadscrew 114. The first leadscrew 114 can be in a threaded fit with the first screw nut 115 to drive a linear movement of the first screw nut 115, which drives a linear translation of the first carrying member 113.

In some embodiments, the first linear motion mechanism 110 can also comprise a leadscrew seat 116a and two motor brackets 116b. The leadscrew seat 116a is provided with a bearing. An end of the first leadscrew 114, which is distal from the first driving member 111, can be disposed in a bearing of the leadscrew seat 116a. The two motor brackets 116b can be fixed on the base plate 100a and disposed opposite to and spaced from each other. A mounting tab 111a can be provided at each of the opposite ends of the first driving member 111. The two mounting tabs 111a can be fixed with the two motor brackets 116b respectively to fix the first driving member 111 on the base plate 100a. The first screw nut 115 can be fixed on the first carrying member 113.

In some embodiments, the first driving member 111 can be an air cylinder provided with a link. The link can be fixedly connected with the first carrying member 113 to drive a movement of the first carrying member 113.

The first linear motion mechanism 110 can comprise a first guiding member 117 which is disposed in parallel to the first axis direction, so as to improve a stability of the first carrying member 113 in translating. The first carrying member 113 can be provided with a first fitting portion 113a which is fitted with the first guiding member 117, such that the first carrying member 113 can slide along the first guiding member 117.

A specific structure of the first guiding member 117 can be determined based on actual requirements. For instance, in the illustrated embodiments, the first guiding member 117 can be a rail which is disposed in parallel to the first axis direction. The first fitting portion 113a can be a sliding block fixed on a bottom of the first carrying member 113. The sliding block can be provided with a sliding groove having a shape fitted with the rail.

Optionally, the first guiding member 117 can be a guide rod which is disposed in parallel to the first axis direction. The first fitting portion 113a can be a hole provided on the first carrying member 113. The guide rod can penetrate through the hole and slide inside the hole.

In some embodiments, two first guiding members 117 can be provided. The two guiding members 117 can be disposed at two sides of the first leadscrew 114 and in parallel to the first leadscrew 114, respectively. It will be apparent that, the number of the first guiding members 117 is not limited to two, and can be one, three, or more than three.

It will be apparent that, the first guiding member 117 can be omitted from the structure, as long as a stability of the first carrying member 113 in translating meets the actual requirements. For instance, in some embodiments, the first driving member 111 can be a linear motor. A primary of the first driving member 111 can be fixedly connected with the first carrying member 113 to drive a synchronous movement thereof. Alternatively, the first driving member 111 can be an air cylinder having no link. The piston of the air cylinder can be fixedly connected with the first carrying member 113 to drive a synchronous movement thereof.

A specific structure of the first carrying member 113 can be determined based on actual requirements. For instance, in the illustrated embodiments, the first carrying member 113 can be a plate provided with a hollow portion. A weight of the plate can be reduced by providing the hollow portion on the plate, without significantly reducing a structural strength of the plate.

The first linear motion mechanism 110 can comprise a first limit switch 118 which is disposed along a first axis direction. The first limit switch 118 can sense a moving position of the first carrying member 113.

The first limit switch 118 can be a photoelectric limit switch, a reed switch limit switch, an inductive limit switch and the like.

The second linear motion mechanism 120 can be provided on the first carrying member 113. A specific structure of the second linear motion mechanism 120 can be determined based on actual requirements. For instance, the second linear motion mechanism 120 can be a rotary motor-driven linear motion mechanism, a belt linear motion mechanism, an air cylinder-driven linear motion mechanism or a linear motor-driven linear motion mechanism. An operational principle of the rotary motor-driven linear motion mechanism, the belt linear motion mechanism, the air cylinder-driven linear motion mechanism and the linear motor-driven linear motion mechanism are described hereinabove.

Figure 7:
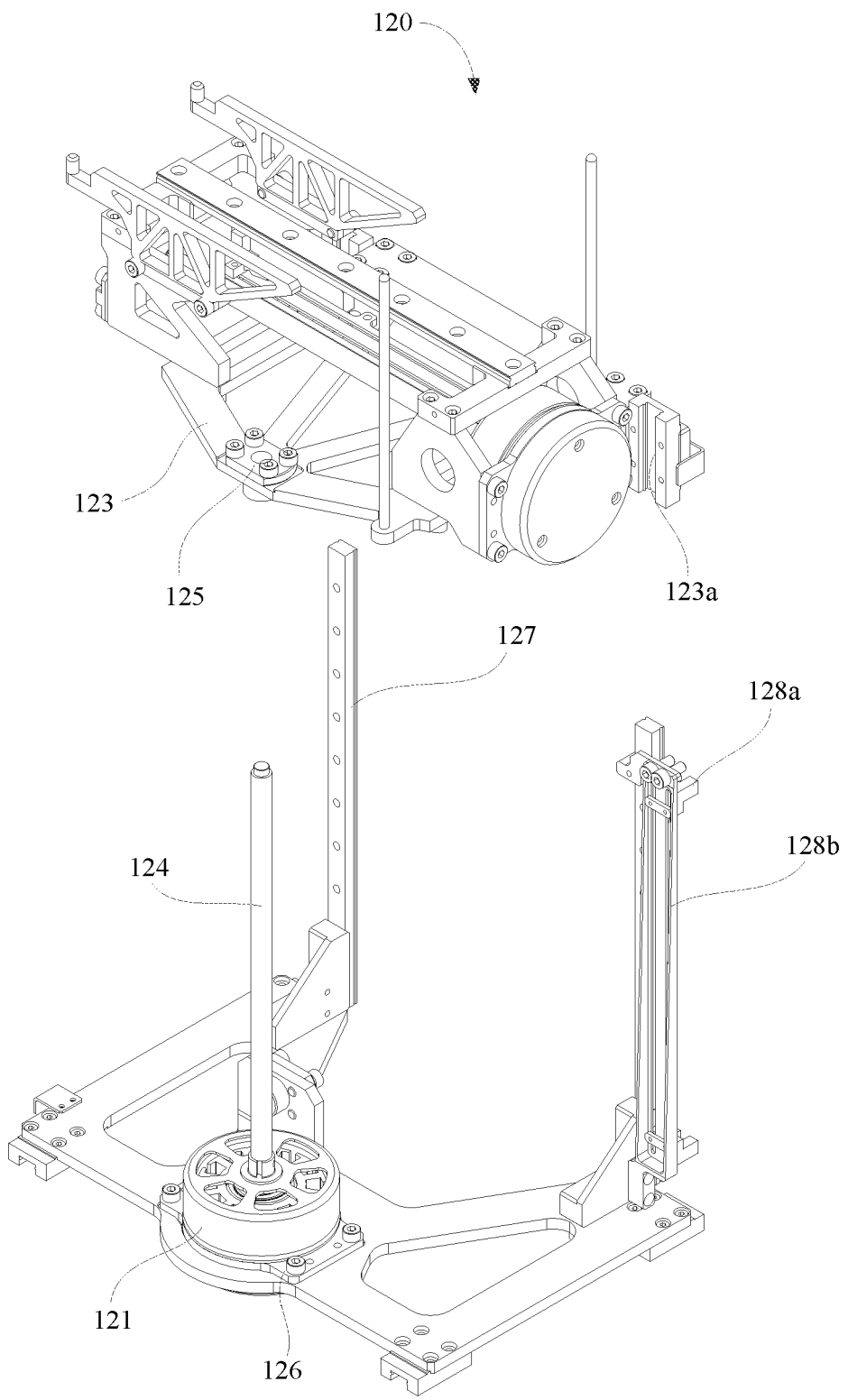
FIG. 7 is an exploded view of a second linear motion mechanism of the unmanned aerial vehicle dock of FIG. 4.

Referring to FIG. 7, in the illustrated embodiments, the second linear motion mechanism 120 can comprise a second driving member 121 and a second carrying member 123. The second driving member 121 can drive the second carrying member 123 to move along a second axis direction.

The second driving member 121 can be an air cylinder or a motor. For instance, in the illustrated embodiments, the second driving member 121 can be a rotary motor. The second linear motion mechanism 120 can comprise a second leadscrew 124 and a second screw nut 125 which is sleeved on the second leadscrew 124. A driving shaft of the second driving member 121 can be fixedly and coaxially connected with one end of the second leadscrew 124. The second screw nut 125 can be fixedly connected with the second carrying member 123. In some embodiments, the second driving member 121 can drive a rotation of the second leadscrew 124. The second leadscrew 124 can be in a threaded fit with the second screw nut 125 to drive a linear movement of the second screw nut 125, which drives a linear translation of the second carrying member 123.

In some embodiments, the second linear motion mechanism 120 can comprise a motor mounting plate 126 on which a second driving member 121 can be fixed. The motor mounting plate 126 can be fixed on the first carrying member 113 by a threaded fastener (not shown). The second screw nut 125 can be fixed on the second carrying member 123.

In some embodiments, the second driving member 121 can be an air cylinder provided with a link. The link can be fixedly connected with the second carrying member 123 to drive a movement thereof.

The second linear motion mechanism 120 can comprise a second guiding member 127 which is disposed in parallel to a second axis direction, so as to improve a stability of the second carrying member 123 in translating. A second fitting portion 123a, which is fitted with the second guiding member 127, can be provided on the second carrying member 123. The second carrying member 123 can slide along the second guiding member 127.

A specific structure of the second guiding member 127 can be determined based on actual requirements. For instance, in the illustrated embodiments, the second guiding member 127 can be a rail which is disposed in parallel to the second axis direction. The second fitting portion 123a can be a sliding block fixed on a bottom of the second carrying member 123. The sliding block can be provided with a sliding groove having a shape fitted with the rail in shape.

Optionally, the second guiding member 127 can be a guide rod which is disposed in parallel to a second axis direction. The second fitting portion 123a can be a hole provided on the second carrying member 123. The guide rod can penetrate through the hole and slide inside the hole.

In some embodiments, two second guiding members 127 can be provided. The two guiding members 127 can be disposed at two sides of the second leadscrew 124 and disposed parallel to the second leadscrew 124, respectively. It will be apparent that, the number of the second guiding members 127 is not limited to two, and can be one, three or more than three.

It will be apparent that, the second guiding member 127 can be omitted from the structure, as long as a stability of the second carrying member 123 in translating meets the actual requirements. For instance, in some embodiments, the second driving member 121 can be a linear motor. A primary of the second driving member 121 can be fixedly connected with the second carrying member 123 to drive a synchronous movement thereof. Alternatively, the second driving member 121 can be an air cylinder having no link. The piston of the air cylinder can be fixedly connected with the second carrying member 123 to drive a synchronous movement thereof.

A specific structure of the second carrying member 123 can be determined based on actual requirements. For instance, in the illustrated embodiments, the second carrying member 123 can be a plate provided with a hollow portion. The weight of the plate can be reduced by providing the hollow portion on the plate, without significantly reducing a structural strength of the plate.

The second linear motion mechanism 120 can also comprise a second limit switch 128a which is disposed along a second axis direction. The second limit switch 128a can sense a moving position of the second carrying member 123. In some embodiments, the second linear motion mechanism 120 can comprise a limit switch mounting plate 128b which is fixedly connected with the second guiding member 127. The second limit switch 128a can be mounted on the limit switch mounting plate 128b.

The second limit switch 128a can be a photoelectric limit switch, a reed switch limit switch, an inductive limit switch and the like.

The third linear motion mechanism 130 can be provided on the second carrying member 123. A specific structure of the third linear motion mechanism 130 can be determined based on actual requirements. For instance, the third linear motion mechanism 130 can be a rotary motor-driven linear motion mechanism, a belt linear motion mechanism, an air cylinder-driven linear motion mechanism or a linear motor-driven linear motion mechanism. An operational principle of the rotary motor-driven linear motion mechanism, the belt linear motion mechanism, the air cylinder-driven linear motion mechanism and the linear motor-driven linear motion mechanism are described hereinabove.

Figure 8:
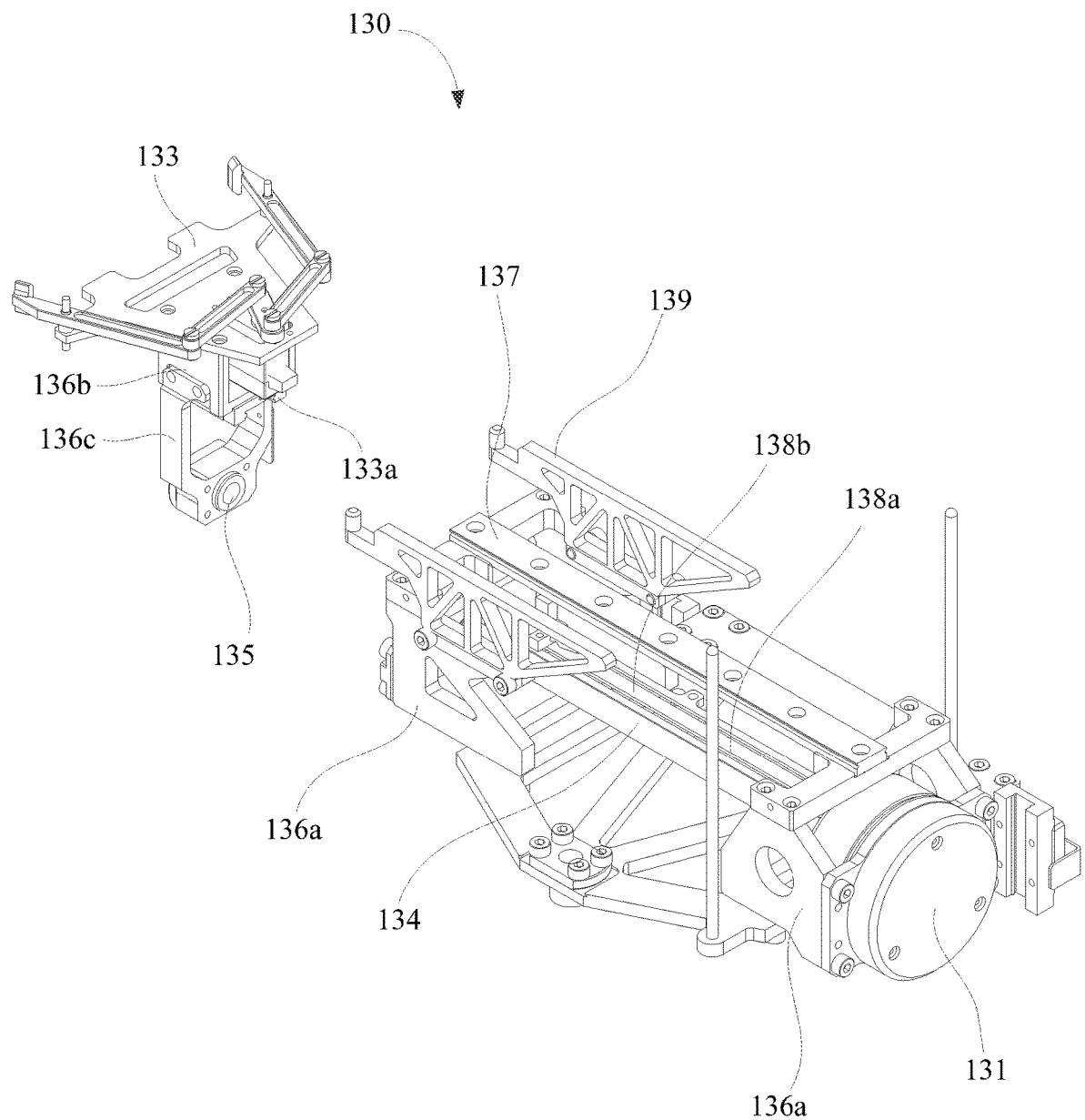
FIG. 8 is an exploded view of a third linear motion mechanism of the unmanned aerial vehicle dock of FIG. 4.

Referring to FIG. 8, in the illustrated embodiments, the third linear motion mechanism 130 can comprise a third driving member 131 and a third carrying member 133. The third driving member 131 can drive the third carrying member 133 to move along a third axis direction. In some embodiments, the first axis direction, the second axis direction and the third axis direction can build a three-dimensional Cartesian coordinate system.

It will be apparent that, the three-dimensional Cartesian coordinate system can be a rectangular coordinate system or an oblique coordinate system. An appropriate coordinate system can be built based on an internal space of an unmanned aerial vehicle dock 100. For instance, if the internal space in the unmanned aerial vehicle dock 100 is a cubic, a Cartesian rectangular coordinate system can be built; thereby the internal space in the unmanned aerial vehicle dock 100 can be reduced. If the internal space in the unmanned aerial vehicle dock 100 is a pyramid or the like, a Cartesian oblique coordinate system can be built; thereby the internal space in the unmanned aerial vehicle dock 100 can be reduced.

The third driving member 131 can be an air cylinder or a motor. For instance, in the illustrated embodiments, the third driving member 131 can be a rotary motor. The third linear motion mechanism 130 can comprise a third leadscrew 134 and a third screw nut 135 which is sleeved on the third leadscrew 134. A driving shaft of the third driving member 131 can be fixedly and coaxially connected with one end of the third leadscrew 134. The third screw nut 135 can be fixedly connected with the third carrying member 133. In some embodiments, the third driving member 131 can drive a rotation of the third leadscrew 134. The third leadscrew 134 can be in a threaded fit with the third screw nut 135 to drive a movement of the third screw nut 135. The third screw nut 135 can drive a linear translation of the third carrying member 133.

In some embodiments, the third driving member 131 can be an air cylinder provided with a link. The link can be fixedly connected with the second carrying member 123 to drive a movement thereof.

The third linear motion mechanism 130 can comprise a third guiding member 137 which is disposed in parallel to a third axis direction, so as to improve a stability of the third carrying member 133 in translating. A third fitting portion 133a, which is fitted with the third guiding member 137, can be provided on the third carrying member 133. The third carrying member 133 can slide along the third guiding member 137.

A specific structure of the third guiding member 137 can be determined based on actual requirements. For instance, in the illustrated embodiments, the third guiding member 137 can be a rail which is disposed in parallel to the third axis direction. The third fitting portion 133a can be a sliding block fixed on the bottom of the third carrying member 133. The sliding block can be provided with a sliding groove having a shape fitted with the rail in shape.

Optionally, the third guiding member 137 can be a guide rod which is disposed in parallel to a third axis direction. The third fitting portion 133a can be a hole provided on the third carrying member 133. The guide rod can penetrate through the hole and slide inside the hole.

In some embodiments, one third guiding member 137 can be provided. The third guiding member 137 can be disposed opposite to the third leadscrew 134 and in parallel to the third leadscrew 134. It will be apparent that, the number of the third guiding members 137 can be two or more than two.

It will be apparent that, the third linear motion mechanism 130 can comprise two guiding member mounting brackets 136a which are fixed on the second carrying member 123 and disposed opposite to and spaced from each other. The third driving member 131 can be mounted at one of the two guiding member mounting brackets 136a. A bearing can be provided at the other one of the two guiding member mounting brackets 136a. One end of the third leadscrew 134, which is distal from the third driving member 131, can be disposed in a bearing which is provided on the other one of the two guiding member mounting brackets 136a. Two ends of the third guiding member 137 can be fixed on the two guiding member mounting brackets 136a, respectively. The third screw nut 135 can be fixed on the third carrying member 133.

The third linear motion mechanism 130 can comprise a carrying member bracket 136b. The third carrying member 133 can be fixedly connected with the third screw nut 135 through the carrying member bracket 136b. In the illustrated embodiments, the carrying member bracket 136b can be a first U-shaped bracket. The third carrying member 133 can be fixed at two ends of the first U-shaped bracket. The third screw nut 135 can be disposed at outer side of a bottom of the first U-shaped bracket.

The third linear motion mechanism 130 can comprise a screw nut bracket 136c. The third screw nut 135 can be fixedly connected with the carrying member bracket 136b through the screw nut bracket 136c. In the illustrated embodiments, the screw nut bracket 136c can be a second U-shaped bracket. The screw nut can penetrate a bottom of the second U-shaped bracket. The two ends of an opening of the second U-shaped bracket can be fixedly connected with the two opposite sides of the bottom of the first U-shaped bracket respectively. The third guiding member 137 can penetrate through a closed space which is formed by the second U-shaped bracket and the first U-shaped bracket.

It will be apparent that, the third guiding member 137 can be omitted from the structure, as long as a stability of the third carrying member 133 when translating meets actual requirements. For instance, in some embodiments, the third driving member 131 can be a linear motor. A primary of the linear motor can be fixedly connected with the third carrying member 133 to drive a synchronous movement thereof.

Alternatively, the third driving member 131 can be an air cylinder having no link. The piston of the air cylinder can be fixedly connected with the third carrying member 133 to drive a synchronous movement thereof. A specific structure of the third carrying member 133 can be determined based on actual requirements. For instance, in the illustrated embodiments, the third carrying member 133 can be a plate provided with a hollow portion. A weight of the plate can be reduced by providing the hollow portion on the plate, without significantly reducing a structural strength of the plate.

The third linear motion mechanism 130 can comprise a third limit switch 138a which is disposed along a third axis direction. The third limit switch 138a can sense a moving position of the third carrying member 133. In some embodiments, the third linear motion mechanism 130 can comprise a limit switch plate 138b. Two ends of the limit switch plate 138b can be fixedly connected with the two guiding member mounting brackets 136a, respectively. The third limit switch 138a can be mounted on the limit switch plate 138b.

The third limit switch 138a can be a photoelectric limit switch, a reed switch limit switch, an inductive limit switch and the like.

The third linear motion mechanism 130 can comprise two battery brackets 139 for supporting a battery 201 of an unmanned aerial vehicle 200. In some embodiments, the two battery brackets 139 can be mounted on the guiding member mounting bracket 136a distal from the third driving member 131. The two battery brackets 139 can be disposed opposite to and spaced from each other.

The clamp mechanism 140 can be mounted on the third carrying member 133 for gripping the battery 201. A coordinate position of the clamp mechanism 140 in a three-dimensional Cartesian coordinate system can be adjusted by the first driving member 111, the second driving member 121 and the third driving member 131, respectively.

It will be apparent that, a position relationship of the first linear motion mechanism 110, the second linear motion mechanism 120 and the third linear motion mechanism 130 can be set based on actual requirements. The position relationship is limited by in the illustrated embodiments.

Figure 9:
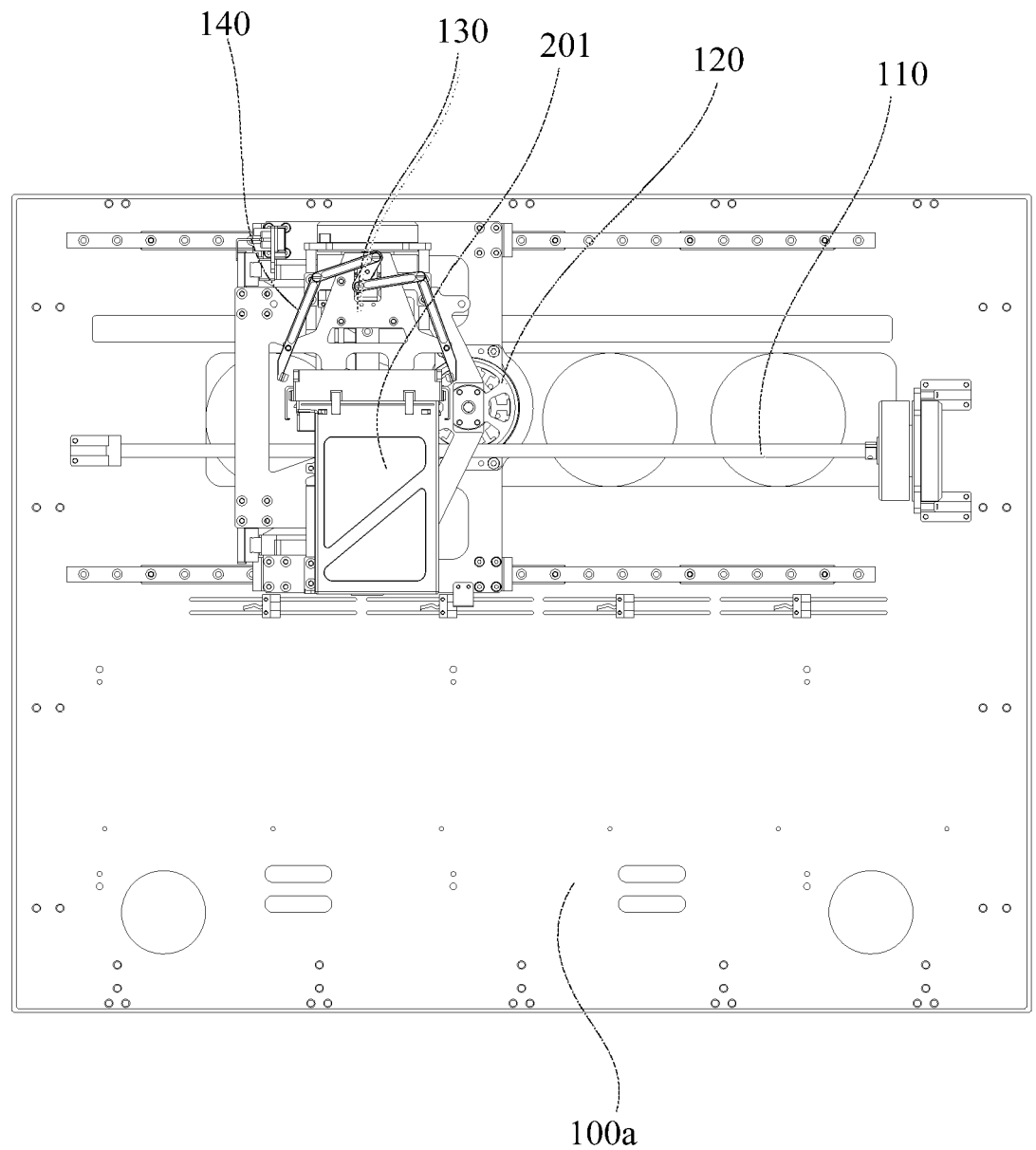
FIG. 9 is a top view of the unmanned aerial vehicle dock of FIG. 4.

Referring to FIG. 9, in some embodiments, the clamp mechanism 140 can be provided on the third linear motion mechanism 130. The third linear motion mechanism 130 can be disposed on the second linear motion mechanism 120, the second linear motion mechanism 120 can be disposed on the first linear motion mechanism 110, and the first linear motion mechanism 110 can be disposed on the base plate 100a. The second linear motion mechanism 120 and the first linear motion mechanism 110 can move in parallel to the base plate 100a, and the third linear motion mechanism 130 can be moved to approach or leave the base plate 100a.

Alternatively, the clamp mechanism 140 can be provided on the third linear motion mechanism 130. The third linear motion mechanism 130 can be disposed on the second linear motion mechanism 120, the second linear motion mechanism 120 can be disposed on the first linear motion mechanism 110, and the first linear motion mechanism 110 can be disposed on the base plate 100a. The third linear motion mechanism 130 and the second linear motion mechanism 120 can move in parallel to the base plate 100a, and the first linear motion mechanism 100 can move to approach or leave the base plate 100a.

The clamp mechanism 140 can be a vacuum suction cup clamp mechanism, a magnet clamp mechanism or a mechanical gripper clamp mechanism. In a vacuum suction cup clamp mechanism, a battery 201 of the unmanned aerial vehicle 200 can be held in by a vacuum suction cup. When gripping the battery 201 of the unmanned aerial vehicle 200, an air cylinder in air communication with the vacuum suction cup can operate to expel an air in the vacuum suction cup; and when releasing the battery 201 of the unmanned aerial vehicle 200, the air cylinder in air communication with the vacuum suction cup can cease an operation blow up the vacuum suction cup. In a magnet clamp mechanism, an iron member made of the battery 201 of the unmanned aerial vehicle 200 can be attracted by an electrical magnet. When the magnet clamp mechanism grips the battery 201 of the unmanned aerial vehicle 200, the electrical magnet can be powered on; and when the magnet clamp mechanism releases the battery 201 of the unmanned aerial vehicle 200, the electrical magnet can be powered off. In a mechanical gripper clamp mechanism, the battery 201 of the unmanned aerial vehicle 200 can be grasped by a clamp structure which is similar to human fingers.

A specific structure of the battery compartment 100c can be determined based on actual requirements. For instance, as shown in FIG. 10, in some embodiments, the battery compartment 100c can comprise a plurality of battery receiving cavities 102 which are arranged in a matrix. The plurality of battery receiving cavities 102 can each have an opening (not shown) which is disposed at a side facing the battery replacement device 100b.

Each of the plurality of battery receiving cavities 102 can be provided with a charging apparatus for charging the battery 201. When the battery 201 is placed into the battery replacement receiving cavity 102, the charging apparatus can charge the battery 201.

The charging apparatus can be a non-contact charging apparatus. Alternatively, the charging apparatus can be a contact charging apparatus. For instance, in some embodiments, the charging apparatus can be a contact charging apparatus which comprises a charging contactor 103. The charging contactor 103 can be provided on an inner wall of an opening of each battery receiving cavity 102. The battery 201 can be provided with a corresponding charging electrode (not shown) in electrical contact with the charging contactor 103.

Alternatively, the charging apparatus can be a non-contact charging apparatus which comprises one of an electromagnetic inductive circuit, a magnetic resonance inductive circuit and a microwave inductive circuit.

A fastener structure 104 can be provided on an inner wall of the opening of each battery receiving cavity 102. The fastener structure 104 can fasten the battery 201 to secure the battery 201 within the battery receiving cavity 102.

The fastener structure 104 can be an elastic clip, an electric lock or an electromagnetic lock. In an elastic clip, an outer wall of the battery 201 can be fastened by an elastic clip. The battery 201 can be drawn from or inserted into the battery receiving cavity 102 of the battery compartment 100c by applying an external force onto the battery 201 such that battery 201 abuts against and deform the elastic clip. In an electric lock, an electric lock can be controlled by a switch circuit to abut against the outer wall of the battery 201. When gripping the battery 201, the switch circuit can power on the electric lock to abut the electric lock against the battery 201. When releasing the battery 201, the switch circuit can power off the electric lock to separate the electric lock from the battery 201. In an electromagnetic lock, the battery 201 can be gripped by an electromagnet which attracts an iron member of the battery 201. The electromagnet can be powered off when taking the battery 201 out from the battery receiving cavity 102 of the battery compartment 100c.

The unmanned aerial vehicle dock 100 consistent with the present disclosure are advantageous over conventional art.

According to an aspect, the battery replacement device 100b of the unmanned aerial vehicle dock 100 comprises three linear motion mechanisms which build a Cartesian coordinate system. The clamp mechanism 140 can be driven by the three linear motion mechanisms to place a battery of an unmanned aerial vehicle 200 into the battery compartment 100c or take a battery of an unmanned aerial vehicle 200 out from the battery compartment 100c, without employing a rotary battery compartment 100c which occupies a larger volume. When the battery replacement device 100b completes a battery replacement or ceases an operation, the battery replacement device 100b can move to a side of the internal space in the unmanned aerial vehicle dock 100 by a translational movement of the three linear motion mechanisms and then contracted, such that the internal space in the unmanned aerial vehicle dock 100. Therefore, the battery replacement device 100b of the unmanned aerial vehicle dock 100 can be reduced. The battery replacement device 100b of the unmanned aerial vehicle dock 100 consistent with the present disclosure has a compact structure and smaller volume; thereby the unmanned aerial vehicle dock 100 can be minimized.

According to another aspect, the battery replacement device 100b of the unmanned aerial vehicle dock 100 consistent with the present disclosure comprises three linear motion mechanisms which build a Cartesian coordinate system. The battery 201 of an unmanned aerial vehicle 200 can be directly inserted into the battery compartment 100c without a need of adjusting an orientation of the battery 201 by an additional driving means. The battery replacement device 100b of the unmanned aerial vehicle dock 100 consistent with the present disclosure has a simpler structure and a lower cost than a conventional battery replacement device.

According to still another aspect, the battery replacement device 100b of the unmanned aerial vehicle dock 100 consistent with the present disclosure comprises three independent driving members for driving three carrying members respectively. Two of the three carrying members can carry two linear motion mechanisms, and the other one of the three carrying members can carry the clamp mechanism 140. The three carrying members can translate independently, such that a stability and flexibility of the clamp mechanism 140 in moving operation is improved.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A battery replacement device comprising:
   a first linear motion mechanism including a first driving member and a first carrying member, the first driving member being configured to drive the first carrying member to move translationally in a first axis direction;
   a second linear motion mechanism mounted on the first carrying member and including a second driving member and a second carrying member, the second driving member being configured to drive the second carrying member to move translationally in a second axis direction;
   a third linear motion mechanism mounted on the second carrying member and including a third driving member and a third carrying member, the third driving member being configured to drive the third carrying member to move translationally in a third axis direction; and
   a clamp mechanism mounted on one of the first carrying member, the second carrying member, and the third carrying member, the clamp mechanism being configured to grip a battery of an unmanned aerial vehicle;
   wherein the first axis direction, the second axis direction and the third axis direction build a three-dimensional Cartesian coordinate system, and a coordinate position of the clamp mechanism in the three-dimensional Cartesian coordinate system is adjusted by the first driving member, the second driving member, and the third driving member.

2. The battery replacement device according to claim 1, wherein:
   the first linear motion mechanism further includes a first guiding member disposed in parallel to the first axis direction; and
   the first carrying member includes a first fitting member configured to be fitted with the first guiding member, such that the first carrying member slides along the first guiding member.

3. The battery replacement device according to claim 2, wherein:
   the first guiding member includes a rail, and the first fitting member includes a sliding block fixed at a bottom of the first carrying member and including a sliding groove having a shape fitting the rail; or
   the first guiding member includes a guide rod, and the first fitting portion includes a hole provided at the first carrying member, the guide rod penetrating through the hole and being configured to slide inside the hole.

4. The battery replacement device according to claim 2, wherein:
   the first driving member includes a rotary motor;
   the first linear motion mechanism further includes a first leadscrew and a first screw nut sleeved on the first leadscrew, a driving shaft of the first driving member being fixedly and coaxially connected with one end of the first leadscrew, and the first screw nut being fixedly connected with the first carrying member; and the first driving member is configured to drive the first leadscrew to rotate, the first leadscrew is in a threaded fit with the first screw nut to drive the first screw nut to move, and the first screw nut is configured to drive the first carrying member to move translationally.

5. The battery replacement device according to claim 4, wherein:

the first linear motion mechanism further includes a leadscrew seat and two motor brackets, the leadscrew seat includes a bearing, an end of the first leadscrew distal from the first driving member is disposed in the bearing of the leadscrew seat;

the two motor brackets are disposed opposite to and spaced apart from each other;

the first driving member includes two mounting tabs each provided at one of two opposite ends of the first driving member, the two mounting tabs being fixedly connected with the two motor brackets, respectively, to fix the first driving member; and the first screw nut is fixed on the first carrying member.

6. The battery replacement device according to claim 4, wherein two first guiding members are provided, the two first guiding members being located at two sides of the first leadscrew, respectively, and disposed in parallel to the first leadscrew.

7. The battery replacement device according to claim 2, wherein the first driving member includes an air cylinder having a link fixedly connected with the first carrying member to drive the first carrying member to move.

8. The battery replacement device according to claim 1, wherein:

the first driving member includes a linear motor, a primary of the linear motor being fixedly connected with the first carrying member to drive the first carrying member to move synchronously; or the first driving member includes an air cylinder having no link, a piston of the air cylinder being fixedly connected with the first carrying member to drive the first carrying member to move synchronously.

9. The battery replacement device according to claim 1, wherein the first carrying member includes a plate having a hollow portion.

10. The battery replacement device according to claim 1, wherein the first linear motion mechanism further includes a first limit switch disposed along the first axis direction and configured to sense a moving position of the first carrying member.

11. The battery replacement device according to claim 10, wherein the first limit switch includes a photoelectric limit switch, a reed switch limit switch, or an inductive limit switch.

12. The battery replacement device according to claim 1, wherein:

the second linear motion mechanism further includes a second guiding member disposed in parallel to the second axis direction; and the second carrying member includes a second fitting member configured to be fitted with the second guiding member, such that the second carrying member slides along the second guiding member.

13. The battery replacement device according to claim 12, wherein the second linear motion mechanism further includes a motor mounting plate on which the second driving member is fixed, the motor mounting plate being fixed on the first carrying member through a threaded fastener.

14. The battery replacement device according to claim 1, wherein:

the third linear motion mechanism further includes a third guiding member disposed in parallel to the third axis direction; and the third carrying member includes a third fitting member configured to be fitted with the third guiding member, such that the third carrying member slides along the third guiding member.

15. The battery replacement device according to claim 1, wherein the clamp mechanism includes a vacuum suction cup clamp mechanism, a magnet clamp mechanism, or a mechanical gripper clamp mechanism.

16. The battery replacement device according to claim 1, wherein:

the first linear motion mechanism, the second linear motion mechanism, and the third linear motion mechanism are configured to move sequentially; or at least two of the first linear motion mechanism, the second linear motion mechanism, or the third linear motion mechanism are configured to move simultaneously.

17. The battery replacement device according to claim 1, wherein the three-dimensional Cartesian coordinate system is a rectangular coordinate system or an oblique coordinate system.

18. The battery replacement device according to claim 1, wherein:

the first linear motion mechanism includes a rotary motor-driven linear motion mechanism, a belt linear motion mechanism, an air cylinder-driven linear motion mechanism, or a linear motor-driven linear motion mechanism;

the second linear motion mechanism includes a rotary motor-driven linear motion mechanism, a belt linear motion mechanism, an air cylinder-driven linear motion mechanism, or a linear motor-driven linear motion mechanism; and/or the third linear motion mechanism includes a rotary motor-driven linear motion mechanism, a belt linear motion mechanism, an air cylinder-driven linear motion mechanism, or a linear motor-driven linear motion mechanism.

19. The battery replacement device according to claim 1, wherein:

the first linear motion mechanism is mounted on a base plate; and the clamp mechanism is mounted on the third carrying member.

20. The battery replacement device according to claim 19, wherein:

the third linear motion mechanism and the first linear motion mechanism are configured to move in parallel to the base plate, and the second linear motion mechanism is configured to move towards or away from the base plate; or the second linear motion mechanism and the first linear motion mechanism are configured to move in parallel to the base plate, and the third linear motion mechanism is configured towards or away from the base plate.

* * * * *